ись
United States Patent
Kakiuchi et al.

(10) Patent No.: US 8,333,079 B2
(45) Date of Patent: *Dec. 18, 2012

(54) ADSORPTION HEAT PUMP AND USE OF ADSORBENT AS ADSORBENT FOR ADSORPTION HEAT PUMP

(75) Inventors: Hiroyuki Kakiuchi, Mie (JP); Takahiko Takewaki, Kanagawa (JP); Masaru Fujii, Fukuoka (JP); Masanori Yamazaki, Kanagawa (JP); Hideaki Takumi, Kanagawa (JP); Hiromu Watanabe, Kanagawa (JP); Kouji Inagaki, Aichi (JP); Atsushi Kosaka, Aichi (JP); Seiji Inoue, Aichi (JP); Satoshi Inoue, Aichi (JP)

(73) Assignees: Mitsubishi Plastics, Inc., Tokyo (JP); Denso Corporation, Kariya-shi (JP)

( * ) Notice: Subject to any disclaimer, the term of this patent is extended or adjusted under 35 U.S.C. 154(b) by 87 days.

This patent is subject to a terminal disclaimer.

(21) Appl. No.: 12/243,278

(22) Filed: Oct. 1, 2008

(65) Prior Publication Data
US 2009/0025403 A1 Jan. 29, 2009

Related U.S. Application Data

(63) Continuation of application No. 10/644,859, filed on Aug. 21, 2003, now Pat. No. 7,497,089, which is a continuation of application No. PCT/JP02/01496, filed on Feb. 20, 2002.

(30) Foreign Application Priority Data

| Feb. 21, 2001 | (JP) | 2001-045677 |
| Apr. 10, 2001 | (JP) | 2001-111902 |
| Jun. 25, 2001 | (JP) | 2001-191893 |
| Sep. 26, 2001 | (JP) | 2001-293990 |
| Dec. 14, 2001 | (JP) | 2001-382029 |

(51) Int. Cl.
*F25B 15/00* (2006.01)
*F25B 13/00* (2006.01)
*B01J 29/06* (2006.01)

(52) U.S. Cl. ............... 62/112; 62/238.3; 62/476; 502/69
(58) Field of Classification Search ............... 62/112, 62/324.2, 238.3, 476, 480; 502/60, 64, 67, 502/69, 527, 11
See application file for complete search history.

(56) References Cited

U.S. PATENT DOCUMENTS
4,310,440 A 1/1982 Wilson et al.
(Continued)

FOREIGN PATENT DOCUMENTS
EP 0 770 836 5/1997
(Continued)

OTHER PUBLICATIONS

M.-H.-S.-Grange, et al., Thermochimica Acta, vol. 329, pp. 77-82, "Contribution to the Study of Framework Modification of SAPO-34 and SAPO-37 Upon Water Adsorption by Thermogravimetry", 1999.

(Continued)

*Primary Examiner* — Chen Wen Jiang
(74) *Attorney, Agent, or Firm* — Oblon, Spivak, McClelland, Maier & Neustadt, L.L.P.

(57) ABSTRACT

An adsorption heat pump is provided in which water vapor can be efficiently adsorbed and desorbed using a heat source having a lower temperature than ones heretofore in use because the pump employs an adsorbent which has a large difference in water adsorption amount in adsorption/desorption and can be regenerated (release the adsorbate) at a low temperature.

The invention provides an adsorption heat pump which comprises an adsorbate, an adsorption/desorption part having an adsorbent for adsorbate adsorption/desorption, a vaporization part for adsorbate vaporization which has been connected to the adsorption/desorption part, and a condensation part for adsorbate condensation which has been connected to the adsorption/desorption part, wherein the adsorbent, when examined at 25° C., gives a water vapor adsorption isotherm which, in the relative vapor pressure range of from 0.05 to 0.30, has a relative vapor pressure region in which a change in relative vapor pressure of 0.15 results in a change in water adsorption amount of 0.18 g/g or larger.

16 Claims, 12 Drawing Sheets

U.S. PATENT DOCUMENTS

| | | | |
|---|---|---|---|
| 4,440,871 | A | 4/1984 | Lok et al. |
| 4,637,218 | A | 1/1987 | Tchernev |
| 4,898,660 | A | 2/1990 | Wilson et al. |
| 5,340,563 | A | 8/1994 | Zones et al. |
| 5,425,934 | A | 6/1995 | Malla et al. |
| 5,518,977 | A | 5/1996 | Dunne et al. |
| 5,768,910 | A | 6/1998 | Inagaki et al. |
| 6,562,754 | B1 | 5/2003 | Inagaki et al. |
| 7,037,360 | B2 | 5/2006 | Inagaki et al. |
| 7,422,993 | B2 | 9/2008 | Takewaki et al. |
| 7,497,089 | B2 * | 3/2009 | Kakiuchi et al. ............ 62/112 |
| 2006/0130652 | A1 | 6/2006 | Takewaki et al. |
| 2006/0245994 | A1 | 11/2006 | Watanabe et al. |

FOREIGN PATENT DOCUMENTS

| | | |
|---|---|---|
| JP | 59-35018 | 2/1984 |
| JP | 1-057041 | 3/1989 |
| JP | 4-37007 | 6/1992 |
| JP | 5-21844 | 3/1993 |
| JP | 5-51533 | 8/1993 |
| JP | 6-58644 | 3/1994 |
| JP | 6-76203 | 3/1994 |
| JP | 6-180159 | 6/1994 |
| JP | 7-501043 | 2/1995 |
| JP | 7-301469 | 11/1995 |
| JP | 9-178292 | 7/1997 |
| JP | 9-227249 | 9/1997 |
| JP | 9-264633 | 10/1997 |
| JP | 11-137947 | 5/1999 |
| JP | 11-197439 | 7/1999 |
| JP | 11-223411 | 8/1999 |
| JP | 11-223417 | 8/1999 |
| JP | 11-281190 | 10/1999 |
| JP | 2000-140625 | 5/2000 |
| JP | 2001-239156 | 9/2001 |
| WO | 93/00152 | 1/1993 |
| WO | 97/49958 | 12/1997 |
| WO | 99/36733 | 7/1999 |

OTHER PUBLICATIONS

Kaguku Kogaku Ronbun-shu, vol. 19, No. 6, pp. 1165-1170, 1993.
K. Tsutsumi, et al., Colloid Polym Sci, vol. 277, pp. 83-88, "Adsorption Characteristics and Surface Free Energy of $AlPO_4$-5", 1999.
Dai-16-kai Zeoraito Kenkyu Happyo Kai Koen Yoko-shu, p. 91, Nov. 21-22, 2000.
High Performance Nancomposite Materials Topical Resort, Mar. 1990-Jun. 1992; cover page, abstract, table of contents, pp. 18-20 and p. 33: prepared for Gas Research Institute, Chicago, IL, Jul. 1992.
Meier, W.M. et al., Atlas of Zeolite Structure Types, Fourth Revised Edition 1996, excerpts.
Zibrowius, Bodo et al., "Multinuclear MAS NMR study of the microporous aluminophosphate $AlPO_4$-17 and the related silicoaluminophosphate SAPO-17", Solid State Nuclear Magnetic Resonance, 1 (1992), pp. 137148.
Bobonich, F.M. et al., "The Relation between the Efficiency of an Adsorbent in a Refrigeration System and its Hydration Isotherm", Theoretical and Experimental Chemistry, vol. 37, No. 2, 2001, pp. 116-120.
Malla P. B. et al.: "Effect of pore size on the chemical removal of organic template molecules from synthetic molecular sieves", Zeolites, Elesevier Science Publishing, US, vol. 15, No., May 1, 1995, pp. 324-332.
P.B. Malla and S. Komarneni: "Synthesis and Water Sorption Properties of Aluminophospate (AIP04) and Silicoaluminophosphate (Sapo) Molecular Sieves", MRS Proceedings, vol. 233, 1991, pp. 237-242.
Supplementary European Search Report issued Oct. 9, 2012 in connection with corresponding European Application No. 02 70 3864, filed Nov. 9, 2003.

* cited by examiner

US 8,333,079 B2

ADSORPTION HEAT PUMP AND USE OF ADSORBENT AS ADSORBENT FOR ADSORPTION HEAT PUMP

This application is a Continuation application of U.S. Ser. No. 10/644,859, now allowed which is a continuation of PCT/JP02/01496 having a filing date of Feb. 20, 2002.

TECHNICAL FIELD

The present invention relates to an adsorption heat pump employing a specific adsorbent and use of the specific adsorbent as an adsorbent for an adsorption heat pump.

BACKGROUND ART

In an adsorption heat pump, the adsorbent having an adsorbate, e.g., water, adsorbed thereon is heated to desorb the adsorbate in order to regenerate the adsorbent, and the adsorbent dried is cooled to a temperature to be used for adsorbate adsorption before being used for adsorbate adsorption again.

Absorption type heat pumps in which waste heat or heat having a relatively high temperature (120° C. or higher) is utilized as a heat source for adsorbent regeneration have already come into practical use. However, since the heat obtained from cogeneration apparatus, fuel cells, cooling water for automotive engines, solar energy, or the like generally has a relatively low temperature of 100° C. or below, it cannot be utilized as a heat source for driving the absorption type heat pumps presently in practical use. It has been desired to effectively utilize low-temperature waste heat of 100° C. or lower, especially from 60° C. to 80° C. In particular, there is a strong desire for the practical use thereof in motor vehicles which generate waste heat in large quantities.

In adsorption heat pumps, the adsorption properties required of adsorbents vary considerably depending on the temperatures of utilizable heat sources even though the heat pumps operate on the same principle. For example, the temperatures of higher-temperature-side heat sources are from 60° C. to 80° C. in the case of waste heat from gas engine cogeneration and from solid polymer type fuel cells and are from 85° C. to 90° C. in the case of cooling water for automotive engines. The temperatures of cooling-side heat sources also vary depending on the places where the apparatus is installed. For example, the cooling-side heat source temperatures in the case of motor vehicles are temperatures obtained with the radiators, while those in buildings, houses, and the like are the temperatures of water-cooling towers, river water, etc. Namely, the operating temperatures for an adsorption heat pump are as follows. In the case of installation in buildings or the like, the lower-side temperatures are from 25° C. to 35° C. and the higher-side temperatures are from 60° C. to 80° C. In the case of installation in motor vehicles or the like, the lower-side temperatures are about from 30° C. to 45° C. and the higher-side temperatures are about from 85° C. to 90° C. There is hence a desire for an apparatus capable of being operated even with a small temperature difference between the lower-temperature-side heat source and the higher-temperature-side heat source so as to effectively utilize waste heat. An adsorbent to be applied to such apparatus is also desired.

Typical adsorbents known as adsorbents for adsorption heat pumps are zeolite 13X and A-form silica gel.

Recently, zeolites are being investigated, such as a mesoporous molecular sieve (e.g., FSM-10) synthesized using the micellar structure of a surfactant as a template (Japanese Patent Laid-Open No. 178292/1997) and a porous aluminum phosphate molecular sieve for use as a desiccant material commonly referred to as $AlPO_4$ (Japanese Patent Laid-Open No. 197439/1999).

It has already been reported that the temperature dependence of adsorption properties is important for the adsorbents for adsorption heat pumps (*Ragaku Kôgaku Ronbun-shû*, Vol. 19, No. 6 (1993), pp. 1165-1170). There is a report therein that SG3 (manufactured by Fuji Silysia Ltd.) shows a large temperature dependence and SG1 (manufactured by the same) does not.

Furthermore, it has been reported that the adsorption performance of $AlPO_4$-5, which is a porous aluminum phosphate molecular sieve, depends on temperature. Specifically, the adsorption performance at 25° C. and that at 30° C. are shown (*Colloid Polym Sci,* 277 (1999) pp. 83-88). Likewise, the temperature dependence of $AlPO_4$-5 has been reported; adsorption isotherms obtained in an adsorption process at 20° C., 25° C., 30° C., 35° C., and 40° C. are shown (*Dai-16-kai Zeoraito Kenkyû Happyô Kai Kôen Yokô-shû*, p. 91; Nov. 21 and 22, 2000).

Use of various adsorbents in adsorption heat pumps is being investigated. However, our investigations revealed that there is yet room for improvement in adsorption performance so as to enable application to an apparatus capable of being operated even with a small temperature difference between the lower-temperature-side heat source and the higher-temperature-side heat source.

DISCLOSURE OF THE INVENTION

In order for an apparatus to sufficiently operate even when the atmosphere surrounding the adsorbent has relatively high temperatures, it is necessary to adsorb the adsorbate at a low relative vapor pressure. In order to reduce the size of an apparatus by reducing the amount of the adsorbent to be used, the amount of an adsorbate adsorbed onto and desorbed from the adsorbent should be large. Furthermore, in order to utilize a low-temperature heat source for adsorbate desorption (adsorbent regeneration), it is necessary that the desorption temperature is low. Namely, it is important that an adsorbent for use in adsorption heat pumps is one which (1) adsorbs an adsorbate at a low relative vapor pressure (capable of high-temperature adsorption), (2) attains a large adsorption/desorption amount, and (3) is capable of adsorbate desorption at a high relative vapor pressure (capable of low-temperature desorption).

The invention has been achieved for the purpose of providing an efficient adsorption heat pump which employs an adsorbent capable of adsorbate adsorption/desorption in a low-relative-vapor-pressure region.

Another object of the invention is to provide use of an adsorbent capable of adsorbate adsorption/desorption in a low-relative-vapor-pressure region as an adsorbent for adsorption heat pumps.

Still another object of the invention is to provide an adsorption heat pump having practically effective adsorption performance.

The invention provides, in one aspect thereof, an adsorption heat pump which comprises an adsorbate, an adsorption/desorption part having an adsorbent for adsorbate adsorption/desorption, a vaporization part for adsorbate vaporization which has been connected to the adsorption/desorption part, and a condensation part for adsorbate condensation which has been connected to the adsorption/desorption part, wherein the adsorbent, when examined at 25° C., gives a water vapor adsorption isotherm which, in the relative vapor pressure range of from 0.05 to 0.30, has a relative vapor pressure region in which a change in relative vapor pressure of 0.15 results in a change in water adsorption amount of 0.18 g/g or larger.

The invention further provides, in another aspect thereof, use of the adsorbent described above as an adsorbent for adsorption heat pumps.

In still another aspect thereof, the invention provides an adsorption heat pump which comprises an adsorbate, an adsorption/desorption part having an adsorbent for adsorbate adsorption/desorption, and a vaporization/condensation part for adsorbate vaporization/condensation which has been connected to the adsorption/desorption part, characterized in that the adsorbent comprises a zeolite containing aluminum, phosphorus, and a heteroatom in the framework structure.

In a further aspect thereof, the invention provides an adsorption heat pump which comprises (a) an adsorbate, (b) an adsorption/desorption part having an adsorbent for adsorbate adsorption/desorption, (c) a vaporization part for adsorbate vaporization which has been connected to the adsorption/desorption part, and (d) a condensation part for adsorbate condensation which has been connected to the adsorption/desorption part, characterized in that the adsorbent comprises a zeolite containing aluminum, phosphorus, and silicon in the framework structure, and that the zeolite gives a $^{29}$Si-NMR spectrum in which the integrated intensity area for the signals at from −108 ppm to −123 ppm is not more than 10% based on the integrated intensity area for the signals at from −70 ppm to −123 ppm.

Furthermore, the present inventors directed attention to the fact that in the adsorption/desorption parts of heat pumps, the operating temperature during adsorbate adsorption differs from that during adsorbate desorption. The inventors made intensive investigations in view of the fact. As a result, they have found that a heat pump having practically useful adsorption performance is one employing an adsorbent in which the value of a specific difference in adsorption amount determined from (1) an adsorption isotherm obtained at an adsorption/desorption part temperature during adsorption operation and (2) a desorption isotherm obtained at an adsorption/desorption part temperature during desorption operation is within a given range. The invention has been achieved based on this finding.

Namely, in still a further aspect thereof, the invention provides the following.

An adsorption heat pump which comprises (a) an adsorbate, (b) an adsorption/desorption part having an adsorbent for adsorbate adsorption/desorption, (c) a vaporization part for adsorbate vaporization which has been connected to the adsorption/desorption part, and (d) a condensation part for adsorbate condensation which has been connected to the adsorption/desorption part, characterized in that (1) the adsorbent comprises a zeolite containing at least aluminum and phosphorus in the framework structure, and (2) the adsorbent is a water vapor adsorbent having a region in which the adsorption amount difference as determined with the following equation is 0.15 g/g or larger in the range in which the relative vapor pressure $\phi2b$ during adsorption operation in the adsorption/desorption part is from 0.115 to 0.18 and the relative vapor pressure $\phi1b$ during desorption operation in the adsorption/desorption part is from 0.1 to 0.14:

Adsorption amount difference=$Q2-Q1$ wherein
Q1=adsorption amount at $\phi1b$ as determined from a water vapor desorption isotherm obtained at a temperature (T3) used for desorption operation in the adsorption/desorption part
Q2=adsorption amount at $\phi2b$ as determined from a water vapor adsorption isotherm obtained at a temperature (T4) used for adsorption operation in the adsorption/desorption part,
provided that
$\phi1b$ (relative vapor pressure during desorption operation in the adsorption/desorption part)=[equilibrium water vapor pressure at the temperature of coolant (T2) cooling the condenser]/[equilibrium water vapor pressure at the temperature of heat medium (T1) heating the adsorption/desorption part]
$\phi2b$ (relative vapor pressure during adsorption operation in the adsorption/desorption part)=[equilibrium vapor pressure at the temperature of cold (T0) generated in the vaporization part]/[equilibrium vapor pressure at the temperature of coolant (T2) cooling the adsorption/desorption part]
(wherein T0=5 to 10° C., T1=T3=90° C., and T2=T4=40 to 45° C.).

Figure 1:
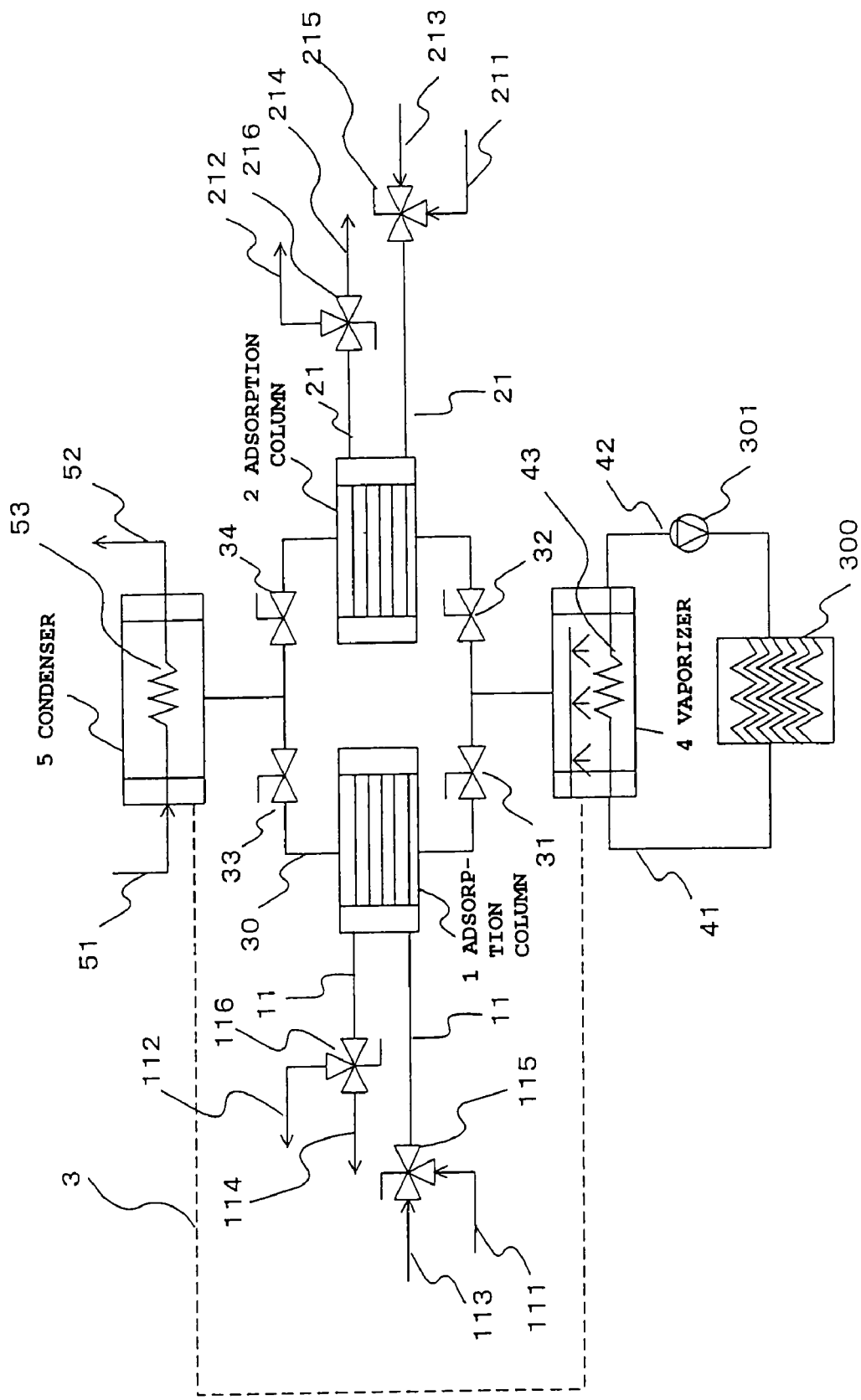
FIG. 1 is a diagrammatic view of an adsorption heat pump.
Figure 2:
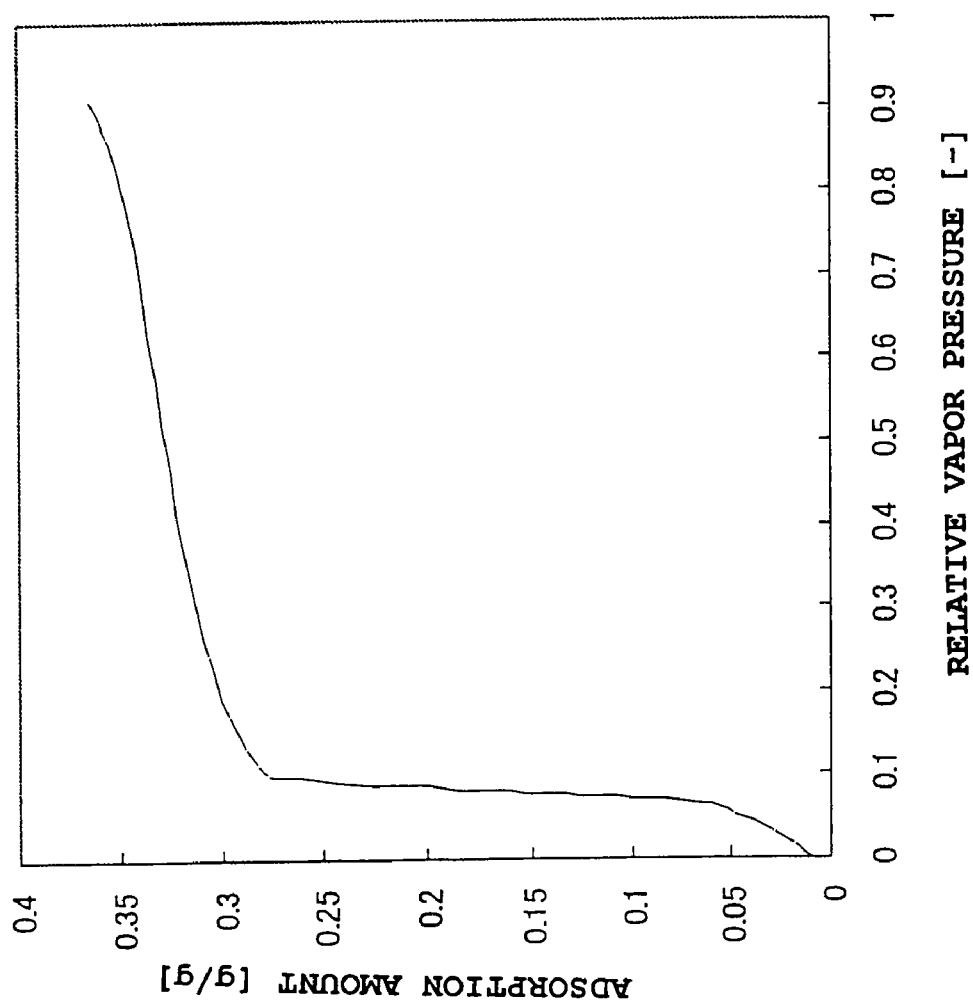
FIG. 2 is a water vapor adsorption isotherm (25° C.) for SAPO-34 (manufactured by UOP LLC) in Example 1.

In the figures, numeral 1 denotes an adsorption column, 2 an adsorption column, 3 an adsorbate piping, 4 a vaporizer, 5 a condenser, 11 a heat medium piping, 111a cooling-water inlet, 112 a cooling-water outlet, 113 a warm-water inlet, 114 a warm-water outlet, 115 a switching valve, 116 a switching valve, 21a heat medium piping, 211 a cooling-water inlet, 212 a cooling-water outlet, 213 a warm-water inlet, 214 a warm-water outlet, 215 a switching valve, 216 a switching valve, 30 an adsorbate piping, 31a control valve, 32 a control valve, 33 a control valve, 34 a control valve, 300 an indoor unit, 301a pump, 41a cold-water piping (inlet), 42 a cold-water piping (outlet), 51a cooling-water piping (inlet), and 52 a cooling-water piping (outlet).

BEST MODE FOR CARRYING OUT THE INVENTION

The invention will be explained below in more detail.

<Structure of Adsorption Pump>

First, the structure of adsorption heat pumps will be explained using the adsorption heat pump shown in FIG. 1 as an example.

An adsorption heat pump is constituted mainly of: an adsorbate; an adsorption/desorption part (adsorption columns 1 and 2) which is packed with an adsorbent capable of adsorbate adsorption/desorption and serves to transfer the heat generated by adsorbate adsorption/desorption to a heat medium (hereinafter the adsorption/desorption part is sometimes referred to as adsorption columns); a vaporization part (vaporizer 4) which serves to take out the cold obtained by adsorbate vaporization; and a condensation part (condenser 5) which serves to release outward the heat obtained by adsorbate condensation.

The vaporizer 4 contains a coolant (water in this embodiment) and is in a hermetically sealed state, with the inside being nearly vacuum. This vaporizer 4 is equipped inside with a heat exchanger 43 for heat exchange between the coolant and a heat medium (in this embodiment, a fluid obtained by mixing water with an ethylene glycol-based antifreeze) which has undergone heat exchange in an indoor unit 300 with the air blowing into the room.

The adsorption columns 1 and 2 have, disposed therein, a heat exchanger having an adsorbent adhered to the surface thereof or packed therein. The condenser 5 has, disposed therein, a heat exchanger 53 for cooling and condensing the vapor coolant (water vapor) released from the adsorption column 1 or 2 with a heat medium which has been cooled with, e.g., the outside air.

The adsorption columns 1 and 2, which are packed with an adsorbent, are connected to each other by an adsorbate piping 30. This adsorbate piping 30 has control valves 31 to 34 disposed therein. In the adsorbate piping, the adsorbate is present in the state of the vapor of the adsorbate or in the form of a mixture of the liquid and vapor of the adsorbate.

To the adsorbate piping 30 have been connected the vaporizer 4 and the condenser 5. The adsorption columns 1 and 2 have been connected in parallel arrangement to the vaporizer 4 and the condenser 5. Between the condenser 5 and the vaporizer 4 is disposed a return piping 3 for returning the adsorbate condensed by the condenser (preferably condensate water resulting from regeneration) to the vaporizer 4. Numeral 41 denotes an inlet for cold water serving as a cooling output from the vaporizer 4, and numeral 51 denotes a cooling-water inlet for introducing cooling water into the condenser 5. Numerals 42 and 52 denote a cold-water outlet and a cooling-water outlet, respectively. The cold-water pipings 41 and 42 are connected to an indoor unit 300 for heat exchange with an indoor space (space to be air-conditioned) and to a pump 301 for circulating cold water.

A heat medium piping 11 and a heat medium piping 21 have been connected respectively to the adsorption column 1 and the adsorption column 2. The heat medium pipings 11 and 21 have switching valves 115 and 116 and switching valves 215 and 216, respectively, disposed therein. A heat medium serving as a heating source or cooling source for heating or cooling the adsorbent in the adsorption columns 1 and 2 is caused to flow through the heat medium pipings 11 and 21, respectively. The heat medium is not particularly limited as long as it can effectively heat/cool the adsorbent packed in the adsorption columns.

Warm water is introduced through an inlet 113 and/or inlet 213 by opening or closing switching valves (three-way valves) 115, 116, 215, and 216. The warm water introduced passes through the adsorption column 1 and/or 2 and is then discharged through an outlet 114 and/or outlet 214. Likewise, cooling water is introduced through an inlet 111 and/or inlet 211 by opening or closing the switching valves 115, 116, 215, and 216, passes through the adsorption column 1 and/or 2, and is then discharged through an outlet 112 and/or outlet 212.

The coolant piping which connects the vaporizer 4 to the adsorption columns 1 and 2 and the coolant piping which connects the condenser 5 to the adsorption columns 1 and 2 have control valves 31 to 34, which open or close the respective coolant pipings. These control valves 31 to 34, the pump 301 for heat medium circulation, and the three-way valves 115, 116, 215, and 216 for controlling the flow of a heat medium are controlled by an electronic controller (not shown).

To the heat medium piping 11 and/or 21 have been connected an outdoor unit disposed so as to be capable of heat exchange with the outside air, a heat source which yields warm water, and a pump for heat medium circulation (all of these are not shown). The heat source is not particularly limited, and examples thereof include cogeneration apparatus, such as automotive engines, gas engines, and gas turbines, and fuel cells. In the case of automotive use, preferred examples of the heat source include automotive engines and automotive fuel cells.

<Outline of Adsorption Heat Pump Operation>

The operation of the air conditioning system (adsorption heat pump) according to this embodiment will be outlined below. The pump 301 is operated to circulate the heat medium through the indoor unit 300 and the vaporizer 4 to thereby vaporize the liquid coolant (preferably water) in the vaporizer 4. The heat medium is thus cooled to cool the air to be blown into the room. Simultaneously with this operation, the control valves 31 to 34 and the three-way valves 115, 116, 215, and 216 are switched so that either of the two adsorption columns 1 and 2 is in the adsorption mode and the other adsorption column is in the desorption mode (regeneration mode).

Specifically, in the case where the first adsorption column 1 is to be operated in the adsorption mode and the second adsorption column 2 is to be operated in the desorption mode, valve switching is conducted in the following manner. The three-way valve 115 and the three-way valve 116 are regulated so as to establish connection to the cooling-water inlet 111 side and the cooling-water outlet 112 side, respectively, while keeping the control valve 31 open and the control valve 33 close. Simultaneously therewith, the three-way valve 215 and the three-way valve 216 are regulated so as to establish connection to the warm-water inlet 213 side and the warm-water outlet 214 side, respectively, while keeping the control valve 32 close and the control valve 34 open.

As a result, the coolant (water vapor) vaporized in the vaporizer 4 flows into the first adsorption column 1 and is adsorbed onto the adsorbent packed therein. During this adsorption, the temperature of this adsorbent is kept at around the temperature of the surrounding air with the cooling water introduced through the inlet 111.

On the other hand, warm water heated by a heat source (or the driving engine in the case of application to a vehicle) is supplied to the second adsorption column 2 through the warm-water inlet 213. As a result, the adsorbent in the second adsorption column releases the coolant which was adsorbed thereon in the adsorption mode. The coolant (water vapor) thus desorbed is cooled and condensed in the condenser 5 for regeneration.

After the lapse of a given time period, the control valves 31 to 34 and the three-way valves 115, 116, 215, and 216 are switched, whereby the modes of the first adsorption column 1 and second adsorption column 2 can be shifted to the desorption mode and the adsorption mode, respectively. By repeating such switching at a given interval, a continuous cooling operation can be conducted.

<Adsorbents>

One feature of the invention resides in the adsorbents used in the adsorption heat pumps.

<Adsorbent 1>

An adsorbent in the invention is an adsorbent which, when examined at 25° C., gives a water vapor adsorption isotherm which, in the relative vapor pressure range of from 0.05 to 0.30, has a relative vapor pressure region in which a change in relative vapor pressure of 0.15 results in a change in water adsorption amount of 0.18 g/g or larger, preferably 0.2 g/g or larger. This adsorbent preferably is one in which that change in water adsorption amount in the range of from 0.05 to 0.20 is 0.18 g/g or larger, preferably 0.2 g/g or larger.

Adsorbates are adsorbed as vapors onto adsorbents. A preferred adsorbent is a material which undergoes a large change in adsorbate adsorption amount in a narrow relative vapor pressure range. The reasons for this are as follows. When such an adsorbent undergoing a large change in adsorption amount in a narrow relative vapor pressure range is used, the amount of the adsorbent necessary for obtaining the same adsorption amount under the same conditions can be reduced and the adsorption heat pump can be operated even with a smaller temperature difference between the heat source for cooling and the heat source for heating.

The preference for that property of an adsorbent will become apparent from the following investigation.

First, the operating vapor pressure range for an adsorption heat pump is determined by the desorption-side relative vapor pressure ($\phi 1a$) and the adsorption-side relative vapor pressure ($\phi 2a$). The values of $\phi 1$ and $\phi 2$ can be calculated using the following equations. The range of from $\phi 1a$ to $\phi 2a$ is the relative vapor pressure range in which the pump can be operated.

Desorption-side relative vapor pressure ($\phi 1a$)=[equilibrium vapor pressure ($T\text{low}1$)]/[equilibrium vapor pressure ($T\text{high}$)]

Adsorption-side relative vapor pressure ($\phi 2a$)=[equilibrium vapor pressure ($T\text{cool}$)]/[equilibrium vapor pressure ($T\text{low}2$)]

The symbols have the following meanings.

Thigh (Temperature of High-Temperature Heat Source):
Temperature of heat medium used for desorbing adsorbate from adsorbent and thereby regenerating the adsorbent Tlow1 (Temperature of Low-Temperature Heat Source):
Temperature of adsorbate in condensation part Tlow2 (Temperature of Low-Temperature Heat Source):
Temperature of heat medium used for cooling regenerated adsorbent in preparation for adsorption Tcool (Temperature of Cold Generated):
Temperature of adsorbate in the vaporization part, i.e., temperature of cold generated The equilibrium vapor pressure can be determined from temperature using an equilibrium vapor pressure curve for the adsorbent.

Examples of the operating vapor pressure range in the case where the adsorbate is water are shown below. When the high-temperature heat source temperature is 80° C. and the low-temperature heat source temperature is 30° C., then the operating vapor pressure range ($\phi 1a$-$\phi 2a$) is from 0.09 to 0.29. Likewise, when the high-temperature heat source temperature is 60° C. and the low-temperature heat source temperature is 30° C., then the operating relative water vapor pressure range ($\phi 1a$-$\phi 2a$) is from 0.21 to 0.29. Furthermore, in the case where waste heat from an automotive engine is utilized for operating an adsorption heat pump, the high-temperature heat source temperature and the low-temperature heat source temperature are estimated at about 90° C. and 30° C., respectively, from a statement given in Japanese Patent Laid-Open No. 2000-140625. In this case, the operating relative vapor pressure range ($\phi 1a$-$\phi 2a$) is from 0.06 to 0.29.

It can hence be thought that in the case where waste heat from gas engine cogeneration or from a solid polymer type fuel cell or automotive engine is utilized for operating an adsorption heat pump, the operating relative vapor pressure range ($\phi 1a$-$\phi 2a$) is from 0.05 to 0.30, preferably from 0.06 to 0.29. Namely, a material undergoing a large change in adsorption amount in this operating moisture range is preferred. Consequently, it is preferred to use a material which changes considerably in adsorption amount in the relative vapor pressure range of usually from 0.05 to 0.30, preferably from 0.06 to 0.29.

For example, the case where a cooling power of 3.0 kW (=10,800 kJ/hr) is to be obtained with an adsorption heat pump is supposed. This value of 3.0 kW is the cooling ability of air conditions for use in general motor vehicles. It is thought from investigations on the engine rooms of various motor vehicles that the volume of an adsorption heat pump is desirably up to 15 liter.

<<Adsorption Amount Difference>>

The weight of an adsorbent capable of being packed into a volume of 15 liter or smaller is then determined.

The parts which should be mounted in the engine room include adsorption column main bodies, a vaporizer, a condenser, and control valves. It is necessary that these parts are mostly united into an assembly having a volume of 15 liter or smaller. It is thought from our investigations that the vaporizer, condenser, and valves can be arranged in a space volume of 4.5 liter. Consequently, the volume of the adsorption column main bodies is about 10.5 liter or smaller. Since the percentage packing of adsorbents in adsorption columns and the bulk density of adsorbents are usually about 30% and about 0.6 kg/liter, respectively, the weight of an adsorbent which can be packed (W) is about 10.5×30%×0.6=1.89 kg.

Properties required of adsorbents will be explained next.

The cooling power R of an adsorption heat pump is expressed by the following equation A.

$$R=(W \cdot \Delta Q \cdot \eta_c \cdot \Delta H/\tau) \cdot \eta_h \quad \text{(equation A)}$$

In equation A, W represents the weight of the adsorbent packed into each adsorption column (one side); $\Delta Q$ represents the equilibrium adsorption amount amplitude which results under the conditions for adsorption and desorption, i.e., the adsorption amount difference (Q2−Q1); $\eta_c$ represents adsorption amplitude efficiency, which shows the proportion of the actual adsorption amplitude in the time between switching operations to the equilibrium adsorption amplitude $\Delta Q$; $\Delta H$ represents the latent heat of vaporization of water; $\tau$ represents the time period between operations of switching to the adsorption mode or desorption mode; and $\eta_h$ represents heat mass efficiency for taking account of the heat mass loss caused by the temperature changes of the adsorbent and heat exchangers between the temperature of warm water and the temperature of cooling water.

As stated above, R is 3 kW and W is 1.89 kg/2=0.95 kg. An investigation which was made previously by us revealed that an appropriate value of T is about 60 seconds, and it has been found that the values of $\Delta H$, $\eta_c$, and $\eta_h$ are 2,500 kJ/kg, 0.6, and 0.85, respectively. Consequently, $\Delta Q$ is determined using equation (A).

$$\Delta Q = R/W/\eta_c/\Delta H \cdot \tau/\eta_h$$
$$= 3.0/0.95/0.6/2500 \cdot 60/0.85$$
$$= 0.149 \text{ kg/kg}$$

Namely, the adsorbent to be used in the adsorption heat pump for motor vehicles is one having a $\Delta Q$ of 0.15 g/g or larger, preferably 0.18 g/g or larger, more preferably 0.20 g/g or larger.

Although the adsorbent was explained above on the assumption that the adsorption heat pump is applied to motor vehicles, it is a matter of course that any adsorbent having the properties shown above can be sufficiently applied to other applications including stationary use.

As a result of the investigations given above, the adsorbent for use in an adsorption heat pump of the invention has been determined.

The adsorbent which shows a water adsorption amount difference of 0.18 g/g or larger when the relative vapor pressure changes by 0.15 in the range of from 0.05 to 0.30 is not particularly limited as long as it satisfies the property requirement. However, zeolites are promising materials. In zeolites, the pore volume, which contributes to adsorption, is governed by the framework density because zeolites are crystalline. Zeolite 13X (framework density, 12.7 T/1,000 Å), which is an example of the zeolites having the lowest framework density, has a maximum adsorption amount of about 0.30 g/g. Consequently, when the adsorption amount as measured at the lower limit of relative vapor pressure of 0.05, which is specified in the invention, is larger than 0.15 g/g, then it is impossible to obtain an adsorption amount difference of 0.18 g/g. Therefore, the adsorption amount at a relative vapor pressure of 0.05, as determined from a water vapor adsorption isotherm, is desirably 0.15 g/g or smaller, preferably 0.12 g/g or smaller, more preferably 0.10 g/g or smaller, still more preferably 0.07 g/g or smaller, and still further preferably 0.05 g/g or smaller.

<Adsorbent 2>

Another feature of an adsorbent in the invention resides in that the adsorbent is a water vapor adsorbent having a region in which the adsorption amount difference as determined with the following equation is 0.15 g/g or larger in the range in which the relative vapor pressure ($\phi 2b$) during adsorption operation in the adsorption/desorption part is from 0.115 to 0.18 and the relative vapor pressure ($\phi 1b$) during desorption operation in the adsorption/desorption part is from 0.1 to 0.14:

Adsorption amount difference=$Q2-Q1$ wherein $Q1$=adsorption amount at $\phi 1b$ as determined from a water vapor desorption isotherm obtained at a temperature (T3) used for desorption operation in the adsorption/desorption part $Q2$=adsorption amount at $\phi 2b$ as determined from a water vapor adsorption isotherm obtained at a temperature (T4) used for adsorption operation in the adsorption/desorption part, provided that $\phi 1b$ (relative vapor pressure during desorption operation in the adsorption/desorption part)=[equilibrium water vapor pressure at the temperature of coolant (T2) cooling the condenser]/[equilibrium water vapor pressure at the temperature of heat medium (T1) heating the adsorption/desorption part]

$\phi 2b$ (relative vapor pressure during adsorption operation in the adsorption/desorption part)=[equilibrium vapor pressure at the temperature of cold (T0) generated in the vaporization part]/[equilibrium vapor pressure at the temperature of coolant (T2) cooling the adsorption/desorption part]

(wherein T0=5 to 10° C., T1=T3=90° C., and T2=T4=40 to 45° C.).

Although the adsorption amount difference for the adsorbent in the invention is thus specified, a more preferred adsorbent satisfies the requirement which is specified under any of the following conditions (A) to (C).

(A) T0 is 10° C. and T2 is 40° C.
(B) T0 is 5° C. and T2 is 40° C.
(C) T0 is 10° C. and T2 is 45° C.

The adsorbent performance described above will be explained below by reference to FIG. 1.

First, an explanation is given on the case of FIG. 1 in which the control valves 31 and 34 are closed and the control valves 32 and 34 are opened.

In this case, the adsorbent packed in the adsorption column 2 adsorbs the water vapor supplied from the vaporizer 4 and thus heats up. During this adsorption, the adsorption column 2 is cooled and deprived of heat by the heat medium (e.g., cooling water) which is passing through the heat medium pipes 211 and 21. The temperature of this heat medium (cooling water), which is supplied through the pipe 211 for cooling the adsorption column 2 (adsorption/desorption part), is referred to as T2.

On the other hand, the temperature of the vaporizer 4 is regulated for the purpose of generating cold. The adsorption-side relative vapor pressure $\phi 2b$ in this operation is defined by the following equation.

Adsorption-side relative vapor pressure $\phi 2b$=[equilibrium water vapor pressure (T0)]/[equilibrium water vapor pressure (T2)]

Equilibrium water vapor pressure (T0): equilibrium water vapor pressure at the temperature T0 of the vaporizer 4

Equilibrium water vapor pressure (T2): equilibrium water vapor pressure at the temperature T2 of the heat medium in the adsorption column 2

On the other hand, the adsorption column 1 during this operation is in the desorption (regeneration) mode. The adsorbent packed in the adsorption column 1 is regenerated by a regenerating heat source (temperature of the heat medium for heating the adsorption/desorption part; this temperature is referred to as T1). The condenser 5 is cooled with the cooling water supplied through the heat medium pipe 51 and thereby condenses water vapor. The desorption-side relative vapor pressure $\phi 1$ in this operation is defined by the following equation.

Desorption-side relative vapor pressure $\phi 1b$ =[equilibrium vapor pressure (T2)]/[equilibrium vapor pressure (T1)]

Equilibrium vapor pressure (T2): equilibrium vapor pressure at the temperature of the condenser 5 (=equilibrium vapor pressure at the temperature T2 of the heat medium in the adsorption column 2)

Equilibrium vapor pressure (T1): equilibrium vapor pressure at the temperature (T1) of the regenerating heat source in the adsorption column 1

An important point here is that in an adsorption column, the temperature during adsorption differs from the temperature during desorption (regeneration). Consequently, in the invention, the adsorption amount difference is determined from a desorption isotherm obtained at a desorption temperature and from an adsorption isotherm obtained at an adsorption isotherm. Specifically, it is calculated using the following equation.

Adsorption amount difference=$Q2-Q1$ wherein $Q1$=adsorption amount at $\phi1b$ as determined from a water vapor desorption isotherm obtained at a temperature (T3) used for desorption operation in the desorption part $Q2$=adsorption amount at $\phi2b$ as determined from a water vapor adsorption isotherm obtained at a temperature (T4) used for adsorption operation in the adsorption/desorption part, provided that $\phi1b$ (relative vapor pressure during desorption operation in the adsorption/desorption part)=[equilibrium water vapor pressure at the temperature of coolant (T2) cooling the condenser]/[equilibrium water vapor pressure at the temperature of heat medium (T1) heating the adsorption/desorption part]

$\phi2b$ (relative vapor pressure during adsorption operation in the adsorption/desorption part)=[equilibrium vapor pressure at the temperature of cold (T0) generated in the vaporization part]/[equilibrium vapor pressure at the temperature of coolant (T2) cooling the adsorption/desorption part]

(wherein T0=5 to 10° C., T1=T3=90° C., and T2=T4=40 to 45° C.).

The adsorbent according to the invention has an adsorption amount difference, as determined with the equation shown above, of 0.15 g/g or larger, preferably 0.18 g/g or larger. The larger the adsorption amount difference, the more the adsorbent is preferred. However, when available material sources which satisfy such performance are taken into account, the adsorption amount difference is usually 0.50 g/g or smaller, practically 0.40 g/g or smaller, especially 0.35 g/g or smaller.

Specifically, the adsorption amount difference is determined through measurements made, for example, under (1) conditions in which T0 is 10° C. and T2 is 40° C., (2) conditions in which T0 is 5° C. and T2 is 40° C., or (3) conditions in which T0 is 10° C. and T2 is 45° C. The adsorption amount difference thus determined may be any value not below 0.15 g/g.

The necessity of the adsorption amount difference of 0.15 g/g or larger is derived from the following investigation, which is made on the supposition that the adsorption heat pump is applied to motor vehicles.

<<Adsorption Temperature, Description Temperature>>

First, an adsorption isotherm and a desorption isotherm are obtained at an adsorption temperature and a desorption temperature, respectively, because the adsorption amount depends on the temperature during adsorption and the temperature during desorption as stated above.

During adsorption, the adsorption column is cooled with cooling water in order to inhibit the column from being heated up by adsorption heat. Because of this, the temperature of the cooling water (T2) is almost equal to the adsorption temperature (T4). On the other hand, during desorption, the adsorption column requires desorption heat and the temperature of warm water (T1) is equal to the desorption temperature (T3).

Incidentally, heat medium temperatures in the adsorption heat pump are as follows: (1) the warm-water temperature is about 90° C. because it is a temperature obtained with the engine-cooling water; (2) the cooling temperature is about from 40° C. to 45° C. because it is a temperature obtained by heat exchange with the outside air; and (3) the temperature of cold water necessary for generating a cold wind is about from 5 to 10° C. Namely, the cold-water temperature is about from 5 to 10° C. on the assumption that the adsorption heat pump is applied to general motor vehicles in Japan. The cooling temperature is about 40° C. in Japan, and is about 45° C. in regions where the outside air temperature is high.

Consequently, the adsorption temperature (T4) is about from 40° C. to 45° C. and the desorption temperature (T3) is about 90° C.

In the invention, the adsorption temperature and the desorption temperature are employed as indexes to adsorbent performance. The adsorbent is one which satisfies the requirement that the adsorption amount difference, as determined from at least one of adsorption isotherms obtained at adsorption temperatures of from 40° C. to 45° C. and from a desorption isotherm obtained at a desorption temperature of 90° C., is 0.15 g/g or larger.

<<Adsorption Amount Difference>>

The adsorption amount difference (0.15 g/g or larger) is determined in the same manner as for adsorbent 1.

Although the adsorbent was explained above on the assumption that the adsorption heat pump is applied to motor vehicles, it is a matter of course that any adsorbent having the properties described above can be sufficiently applied to other applications including stationary use.

It is noted that the adsorption amount difference according to the invention is satisfied in the range in which the relative vapor pressure during adsorption operation $\phi1b$ in the adsorption/desorption part is from 0.115 to 0.18 and the relative vapor pressure during desorption operation $\phi1b$ in the adsorption/desorption part is from 0.1 to 0.14. This range roughly corresponds to the range of operating relative vapor pressures for adsorption heat pumps.

When the adsorbent has a region in which the adsorption amount difference is 0.15 g/g or larger in the range in which $\phi1b$ and +2b are from 0.115 to 0.18 and $\phi1b$ is equal to or higher than $\phi2b$, then this adsorbent is advantageous because the adsorption heat pump can be operated therewith even under severe temperature conditions which have been thought to be unable to be used for operating adsorption heat pumps.

Adsorbent 2 described above is selected from zeolites containing at least aluminum and phosphorus in the framework structure.

<Adsorbent Materials>

The adsorbents in the invention preferably are zeolites. Especially preferred is a zeolite containing aluminum, phosphorus, and a heteroatom in the framework structure. The zeolites here may be natural zeolites or artificial zeolites. Examples of the artificial zeolites include the aluminosilicates, aluminophosphates, and the like defined by International Zeolite Association (IZA).

Of the aluminophosphates, ALPO$_4$-5 is unsuitable for use as an adsorbent in the invention because it shows hydrophobic adsorption properties. For making this material suitable for use as an adsorbent in the invention, it is preferred to replace part of the aluminum and phosphorus with a heteroatom, e.g., silicon, lithium, magnesium, titanium, zirconium, vanadium, chromium, manganese, iron, cobalt, nickel, palladium, copper, zinc, gallium, germanium, arsenic, tin, calcium, or boron, in order to impart hydrophilicity.

Preferred of those are zeolites formed by replacing part of the aluminum and phosphorus with silicon, magnesium, titanium, zirconium, iron, cobalt, zinc, gallium, or boron. Most preferred of these are zeolites formed by replacement with silicon; this kind of zeolites are commonly called SAPO. The heteroatoms thus incorporated may be of two or more kinds.

A preferred aluminophosphate among the zeolites usable as adsorbents in the invention is a zeolite which contains aluminum, phosphorus, and a heteroatom in the framework structure and in which the proportions of the atoms present are represented by the following expressions (1), (2), and (3):

$$0.001 \leq x \leq 0.3 \quad (1)$$

(wherein x represents the molar proportion of the heteroatom in the framework structure to the sum of aluminum, phosphorus, and the heteroatom in the framework structure);

$$0.3 \leq y \leq 0.6 \quad (2)$$

(wherein y represents the molar proportion of aluminum in the framework structure to the sum of aluminum, phosphorus, and the heteroatom in the framework structure);

$$0.3 \leq z \leq 0.6 \quad (3)$$

(wherein z represents the molar proportion of phosphorus in the framework structure to the sum of aluminum, phosphorus, and the heteroatom in the framework structure).
Among the proportions of atoms present, the proportion of the heteroatom is preferably represented by the following expression (4):

$$0.003 \leq x \leq 0.25 \quad (4)$$

(wherein x is as defined above)
and more preferably represented by the following expression (5):

$$0.005 \leq x \leq 0.2 \quad (5)$$

(wherein x is as defined above).

Preferred of the zeolites containing aluminum, phosphorus, and a heteroatom in the framework structure are ones in which the heteroatom is silicon atom and which give a $^{29}$Si-MAS-NMR spectrum in which the integrated intensity area for the signals at from −108 ppm to −123 ppm is not more than 10% based on the integrated intensity area for the signals at from −70 ppm to −123 ppm. That integrated intensity area ratio is more preferably 9.5% or less, especially preferably 9% or less.

Furthermore, the zeolites preferably are ones which give a 29Si-MAS-NMR spectrum in which the integrated intensity area for the signals at from −70 ppm to −92 ppm is not less than 25% based on the integrated intensity area for the signals at from −70 ppm to −123 ppm. That integrated intensity area ratio is more preferably 50% or more.

The 29Si-MAS-NMR spectra in the invention are ones obtained by a method in which a sample is stored in a water-containing desiccator at room temperature over a whole day and night to cause the sample to adsorb water to saturation and this sample is examined under the following conditions using tetramethylsilane as a reference material.

| | |
|---|---|
| Apparatus: | Chemagnetic CMX-400 |
| Probe: | 7.5 mm MAS Probe |
| Resonance frequency: | 79.445 MHz |
| Pulse duration: | 5.0 microsecond |
| Pulse series: | single pulse |
| Waiting time: | 60 seconds |
| Revolution speed: | 4,000 rps |

A $^{29}$Si-MAS-NMR spectrum for a zeolite gives information about the combined state of silicon in the zeolite. From the positions and distribution of peaks, the combined state of silicon can be understood.

Although a preferred zeolite in the invention contains aluminum, phosphorus, and silicon, the silicon atoms in the zeolite are present as SiO$_2$ units. In a $^{29}$Si-MAS-NMR spectrum, the peak appearing at around −90 ppm is attributable to silicon atoms each bonded, through oxygen atoms, to four atoms other than silicon atoms. In contrast, the peak appearing at around −110 ppm is attributable to silicon atoms each bonded to four silicon atoms through oxygen atoms. Namely, when a zeolite gives a spectrum in which the peak at around −110 ppm has a high intensity, this means that silicon atoms have gathered together, i.e., the silicon atoms in the zeolite are in a lowly dispersed state.

Zeolites giving such a spectrum tend to satisfy the requirement concerning adsorption properties according to the invention. This may be because the dispersion of silicon influences the adsorption properties of the zeolites and a zeolite having high silicon dispersion exhibits performance especially suitable for adsorbents for adsorption heat pumps as will be described later.

On the other hand, the zeolite to be used as an adsorbent in the invention preferably is one having a framework density of from 10.0 T/1,000 Å$^3$ to 16.0 T/1,000 Å$^3$. More preferred is a zeolite in which the framework density is in the range of from 10.0 T/1,000 Å$^3$ to 15.0 T/1,000 Å$^3$. The term framework density herein means the number of framework-constituting elements other than oxygen per 1,000 Å$^3$ of the zeolite; this value is governed by the structure of the zeolite.

Framework density correlates to pore volume. In general, when the framework density is high, the pore volume is small and this tends to result in an insufficient adsorption amount and poor performance in use as an adsorbent for adsorption heat pumps. On the other hand, when the framework density is low, the volume of pores capable of adsorption is large. Although this adsorbent has an increased adsorption amount, it tends to have a reduced density and poor strength.

Examples of zeolite structures satisfying the requirement concerning framework density include AFG, MER, LIO, LOS, PHI, BOG, ERI, OFF, PAU, EAB, AFT, LEV, LTN, AEI, AFR, AFX, GIS, KFI, CHA, GME, THO, MEI, VFI, AFS, LTA, FAU, RHO, DFO, EMT, AFY, and *BEA in terms of the code defined by IZA. Preferred examples thereof include AEI, GIS, KFI, CHA, GME, VFI, AFS, LTA, FAU, RHO, EMT, AFY, and *BEA. Preferred are zeolites having the structure CHA, AEI, or ERI. Especially preferred of these is the structure CHA.

The structure of a zeolite is determined by obtaining an XRD pattern through powder XRD (powder X-ray diffraction) and comparing this pattern with XRD patterns given in *Collection Of Simulated XRD Powder Patterns For Zeolites* (1996, ELSEVIER).

Furthermore, the relationship between structure and framework density is described in *Atlas Of Zeolite Structure Types* (1996, ELSEVIER), IZA. Framework density can hence be determined from the structure.

For example, the silicoaluminophosphate known as SAPO-34, which contains atoms of elements including silicon incorporated in the zeolite framework structure, can be used as an aluminophosphate of the CHA structure. Thus, desired adsorption performance can be imparted.

Although the adsorbents in the invention preferably are zeolites containing aluminum, phosphorus, and a heteroatom in the framework structure, the zeolites may be aluminosilicates as long as they have the adsorbent properties described above. In this case, part of the silicon and aluminum (or with respect to the aluminum, all of it) in the framework may have been replaced with other atoms, e.g., magnesium, titanium, zirconium, vanadium, chromium, manganese, iron, cobalt, zinc, gallium, tin, or boron. In case where aluminosilicates have too small a silicon/aluminum molar ratio, abrupt adsorption occurs in a region of too low humidities as in the case of zeolite 13X. In case where that ratio is too large, the aluminosilicates are too hydrophobic to sufficiently adsorb water. Consequently, the zeolite to be used in the invention has a silicon/aluminum molar ratio of generally from 4 to 20, preferably from 4.5 to 18, more preferably from 5 to 16.

The zeolites described above include ones having cation species exchangeable with other cations. In this case, examples of the cation species include proton, alkali elements such as Li and Na, alkaline earth elements such as Mg and Ca, rare earth elements such as La and Ce, transition metals such as Fe, Co, and Ni, and the like. Preferred are proton, alkali elements, alkaline earth elements, and rare earth elements. More preferred are proton, Li, Na, K, Mg, and Ca. These zeolites may be used alone or used in combination of two or more thereof or in combination with another material such as silica, alumina, active carbon, or clay.

The adsorbents in the invention have a pore diameter of preferably 3 Å or larger, especially 3.1 Å or larger. The pore diameter thereof is preferably 10 Å or smaller, especially 8 Å or smaller, more preferably 7.5 Å or smaller. In case where the pore diameter thereof is too large, there is the possibility that adsorption might not occur at desired relative humidities. In case where the pore diameter thereof is too small, molecules of water used as an adsorbate tend to less diffuse in the adsorbent.

The adsorbents in the invention preferably have a heat of adsorption of from 40 kJ/mol to 65 kJ/mol. This is because susceptibility to desorption also is an important property for adsorbents for adsorption heat pumps in which it is required that desorption occurs with a heat source of 100° C. or lower. Susceptibility to desorption is inversely proportional to adsorption force. Consequently, the heat of adsorption, which is an index to the degree of adsorption, desirably is close to the latent heat of condensation of water. The heat of adsorption for the adsorbents, which is not lower than the latent heat of condensation of water, may be 40 kJ/mol or higher. In case where the heat of adsorption is too high, desorption with a heat source of 100° C. or lower tends to be difficult. Consequently, a zeolite having a heat of adsorption not lower than the latent heat of condensation of water and not higher than 65 kJ/mol is preferred. In this description, a differential heat of adsorption was determined through simultaneous measurements of adsorption amount and heat of adsorption (measuring temperature, 25° C.) by the method described in a document (*Colloid Polym Sci*, 277 (1999) pp. 83-88), and the differential heat of adsorption for the adsorption amount range of from 0.005 mol/g to 0.01 mol/g was taken as the heat of adsorption.

An especially preferred example of the adsorbents for use in the invention is SAPO 34, which is an SAPO (silicoaluminophosphate) in a CHA form (framework density= 14.6 T/1,000 Å$^3$).

Processes for producing the zeolite in the invention are not particularly limited as long as the zeolite has the properties described above. For example, the zeolite can be produced in the following manner according to the method described in Japanese Patent Publication No. 37007/1992, Japanese Patent Publication No. 21844/1993, Japanese Patent Publication No. 51533/1993, U.S. Pat. No. 4,440,871, etc. A method of synthesizing SAPO-34 is described in U.S. Pat. No. 4,440, 871.

In particular, examples of processes for producing the preferred zeolite containing aluminum, phosphorus, and silicon atoms in the framework structure include the following method.

First, an aluminum source, silica source, phosphate source, and template are mixed together to prepare an aqueous gel.

As the aluminum source is used pseudoboehmite, aluminum isopropoxide, aluminum hydroxide, alumina sol, sodium aluminate, or the like.

As the silica source is used fumed silica, silica sol, colloidal silica, water glass, ethyl silicate, methyl silicate, or the like.

As the phosphate source is used phosphoric acid. Aluminum phosphate also is usable.

As the template is used a quaternary ammonium salt such as a tetramethylammonium, tetraethylammonium, tetrapropylammonium, or tetrabutylammonium, or a primary amine, secondary amine, tertiary amine, or polyamine, such as morpholine, di-n-propylamine, tripropylamine, triethylamine, triethanolamine, piperidine, cyclohexylamine, 2-methylpyridine, N,N-dimethylbenzylamine, N,N-diethylethanolamine, dicyclohexylamine, N,N-dimethylethanolamine, choline, N,N'-dimethylpiperazine, 1,4-diazabicyclo(2,2,2)octane, N-methyldiethanolamine, N-methylethanolamine, N-methylpiperidine, 3-methylpiperidine, N-methylcyclohexylamine, 3-methylpyridine, 4-methylpyridine, quinuclidine, N,N'-dimethyl-1,4-diazabicyclo(2,2,2)-octaneion, di-n-butylamine, neopentylamine, di-n-pentylamine, isopropylamine, t-butylamine, ethylenediamine, pyrrolidine, 2-imidazolidone, diisopropylethylamine, or dimethylcyclohexylamine.

The sequence of mixing an aluminum source, silica source, phosphate source, and template varies depending on conditions. In general, however, a phosphate source is first mixed with an aluminum source, and the resultant mixture is mixed with a silica source and a template. The composition of the aqueous gel is generally such that $0.02<SiO_2/P_2O_5<20$ and $0.02<SiO_2/Al_2O_3<20$, preferably such that $0.04<SiO_2/P_2O_5<10$ and $0.04<SiO_2/Al_2O_3<10$, in terms of oxide molar ratio. The pH of the aqueous gel is from 5 to 10, preferably from 6 to 9.

Ingredients other than those shown above may suitably coexist in the aqueous gel. Examples of such ingredients include hydroxides and salts of alkali metals or alkaline earth metals and hydrophilic organic solvents such as alcohols.

The aqueous gel prepared is placed in a pressure vessel and held at a given temperature, while being stirred or allowed to stand, under the pressure generated by the gel itself or under a gas pressure which does not inhibit crystallization. Thus, hydrothermal synthesis is conducted.

Conditions for the hydrothermal synthesis include a temperature of generally from 100° C. to 300° C., preferably from 120° C. to 250° C. The reaction time is generally from 5 hours to 30 days, preferably from 10 hours to 15 days.

After the hydrothermal synthesis, the reaction product is separated, washed with water, and dried. The organic matters contained therein are removed by burning or another method to obtain a zeolite.

In the case where the zeolite is processed for use as a water vapor adsorbent, care should be taken not to reduce the adsorption performance of the zeolite. In general, however, an inorganic binder such as alumina or silica is used to mold the zeolite.

Silica gel, mesoporous silica, alumina, active carbon, clay, or the like may be incorporated into the adsorbent besides the zeolite according to the invention in order to impart desired water vapor adsorption properties to the adsorbent. However, from the standpoint of obtaining satisfactory adsorption properties at low relative vapor pressures, the proportion of the zeolite in the adsorbent according to the invention is generally 60% by weight or higher, preferably 70% by weight or higher, more preferably 80% by weight or higher. From the standpoint of adsorption properties, it is most preferred to use the zeolite alone as a water vapor adsorbent.

For application to an adsorption heat pump or the like, the adsorbent is used after being processed by a known method so as to have a given strength, particle diameter, and shape according to the application. For example, the size of adsorbent particles suitable for use in adsorption heat pumps is about from 0.05 mm to 2 mm as disclosed in Japanese Patent Laid-Open No. 2001-38188. In the case where the adsorbent is bonded to an adsorption core with an adhesive as disclosed in Japanese Patent Laid-Open No. 2000-18767, it is necessary that the adsorbent particles have such a strength that they do not break when mixed with the adhesive and dispersed.

<Method of Operation>

A method of operating an adsorption heat pump is explained with reference to FIG. 1. In the first step, the control valves 31 and 34 are closed and the control valves 32 and 33 are opened to thereby operate the adsorption column 1 and the adsorption column 2 in the regeneration mode and the adsorption mode, respectively. Furthermore, the switching valves 115, 116, 215, and 216 are regulated to pass warm water and cooling water through the heat medium pipe 11 and heat medium pipe 21, respectively.

For example, in the case where the adsorption column 2 is to be cooled, cooling water which has been cooled by heat exchange with the outside air, river water, or the like by means of a heat exchanger, e.g., a cooling column, is introduced through the heat medium pipe 21 to cool the adsorption column 2 usually to about 30 to 40° C. Furthermore, the control valve 32 is opened and, as a result, the water present in the vaporizer 4 vaporizes and the resultant water vapor flows into the adsorption column 2 and is adsorbed onto the adsorbent. The movement of water vapor occurs based on the difference between the saturation vapor pressure at the vaporization temperature and the adsorption equilibrium pressure corresponding to the adsorbent temperature (generally from 20 to 50° C., preferably from 20 to 45° C., more preferably from 30 to 40° C.). As a result, cold, i.e., a cooling output, corresponding the heat of vaporization is obtained in the vaporizer 4. The adsorption-side relative vapor pressure $\phi 2a$ is determined from the relationship between the temperature of cooling water for the adsorption column and the temperature of the cold water yielded in the vaporizer ($\phi 2a$ is obtained by diving the equilibrium vapor pressure of the adsorbate at the temperature of the cold water yielded in the vaporizer by the equilibrium vapor pressure of the adsorbate at the temperature of the cooling water in the adsorption column). It is, however, preferred to operate so that $\phi 2a$ is higher than the relative vapor pressures at which the adsorbent specified in the invention adsorbs a maximum amount of water vapor. This is because when $\phi 2a$ is lower than the relative vapor pressures at which the adsorbent specified in the invention adsorbs a maximum amount of water vapor, then the adsorbing ability of the adsorbent cannot be effectively utilized, resulting in an impaired operation efficiency. Although $\phi 2a$ can be suitably selected according to the ambient temperature, etc., the adsorption heat pump is operated under such temperature conditions that the adsorption amount at $\phi 2a$ is generally 0.20 or larger, preferably 0.29 or larger, more preferably 0.30 or larger. This adsorption amount is determined from an adsorption isotherm obtained at 25° C.

The adsorption column 1 in the regeneration mode is heated with warm water of generally from 40 to 100° C., preferably from 50 to 98° C., more preferably from 60 to 95° C., and comes to have an equilibrium vapor pressure corresponding to the temperature range shown above. Condensation thus occurs at the saturation vapor pressure at a condensation temperature of from 30 to 40° C. in the condenser 5 (this temperature is equal to the temperature of the cooling water with which the condenser is being cooled). Water vapor moves from the adsorption column 1 to the condenser 5 and is condensed to water. The water is returned to the vaporizer 4 through the return piping 3. The desorption-side relative vapor pressure $\phi 1a$ is determined from the relationship between the temperature of cooling water for the condenser and the temperature of warm water ($\phi 1$ is obtained by dividing the equilibrium vapor pressure of the adsorbate at the temperature of the cooling water for the condenser by the equilibrium vapor pressure of the adsorbate at the temperature of the warm water). It is, however, preferred to operate so that $\phi 1a$ is lower than the relative vapor pressers at which the adsorbent abruptly adsorbs water vapor. Although $\phi 1a$ can be suitably selected according to the ambient temperature, etc., the adsorption heat pump is operated under such temperature conditions that the adsorption amount at $\phi 1a$ is generally 0.06 or smaller, preferably 0.05 or smaller. Incidentally, the adsorption heat pump is operated so that the difference between the adsorbate adsorption amount at $\phi 1a$ and the adsorbate adsorption amount at $\phi 2a$ is generally 0.18 g/g or larger, preferably 0.20 g/g or larger, more preferably 0.25 g/g or larger. The first step is conducted in the manner described above.

In the subsequent step as the second step, the control valves 31 to 34 and the switching valves 115, 116, 215, and 216 are switched so as to operate the adsorption column 1 and the adsorption column 2 in the adsorption mode and the regeneration mode, respectively, whereby cold, i.e., a cooling output, can be obtained from the vaporizer 4. By alternately conducting the first and second steps described above, the adsorption heat pump is continuously operated.

An operation method was explained above with respect to an adsorption heat pump having two adsorption columns. However, any desired number of adsorption columns may be disposed as long as any of the adsorption columns can be made to retain the state of being capable of adsorbing the adsorbate by suitably desorbing the adsorbate adsorbed on the adsorbent.

Adsorption heat pumps utilize as a driving force the ability of an adsorbent to adsorb and release an adsorbate. Although water, ethanol, acetone, and the like can be used as the adsorbate in adsorption heat pumps, water is most preferred from the standpoints of safety, cost, and the large quantity of latent head of vaporization.

The adsorption heat pumps of the invention employ an adsorbent capable of undergoing a large change in adsorption amount with a change in relative vapor pressure in a narrow range. The adsorption heat pumps are hence suitable for use in applications where apparatus size reduction is required and adsorbent packing amounts are limited, such as, e.g., air conditioning systems for vehicles.

EXAMPLES

The invention will be explained below in detail by reference to Examples, but the invention should not be construed as being limited by the following Examples in any way.

In the following Examples, water vapor adsorption isotherms at 25° C. were obtained by examining the adsorbents for water vapor adsorption properties under the following conditions.
Adsorption isotherm analyzer: Belsorb 18 (manufactured by Bel Japan Inc.)
Temperature of high-temperature air chamber: 50° C.
Adsorption temperature: 25° C.
Initial pressure introduced: 3.0 Torr
Number of points for setting pressure introduced: 0
Saturated vapor pressure: 23.76 mmHg
Equilibrium time: 500 sec
Pretreatment: 300° C. 5-hour evacuation
A measurement for determining the differential heat of adsorption was made under the following conditions.
Measuring apparatus: calorimeter and adsorption amount-measuring apparatus (manufactured by Tokyo Riko)
Temperature of measurement part: 25° C.
Temperature of thermostatic chamber for vapor introduction: 30° C.

Example 1

A water vapor adsorption isotherm (25° C.) for SAPO-34 (manufactured by UOP LLC) is shown in FIG. 1. It can be seen from FIG. 1 that the adsorbent abruptly adsorbs water vapor at relative vapor pressures of from 0.07 to 0.10, and that the change in adsorption amount in the relative vapor pressure range of from 0.05 to 0.20 is 0.25 g/g.

SAPO-34 is a CHA-form silicoaluminophosphate; the CHA form has a framework density of 14.6 T/1,000 Å3 and a pore diameter of 3.8 Å.

Figure 3:
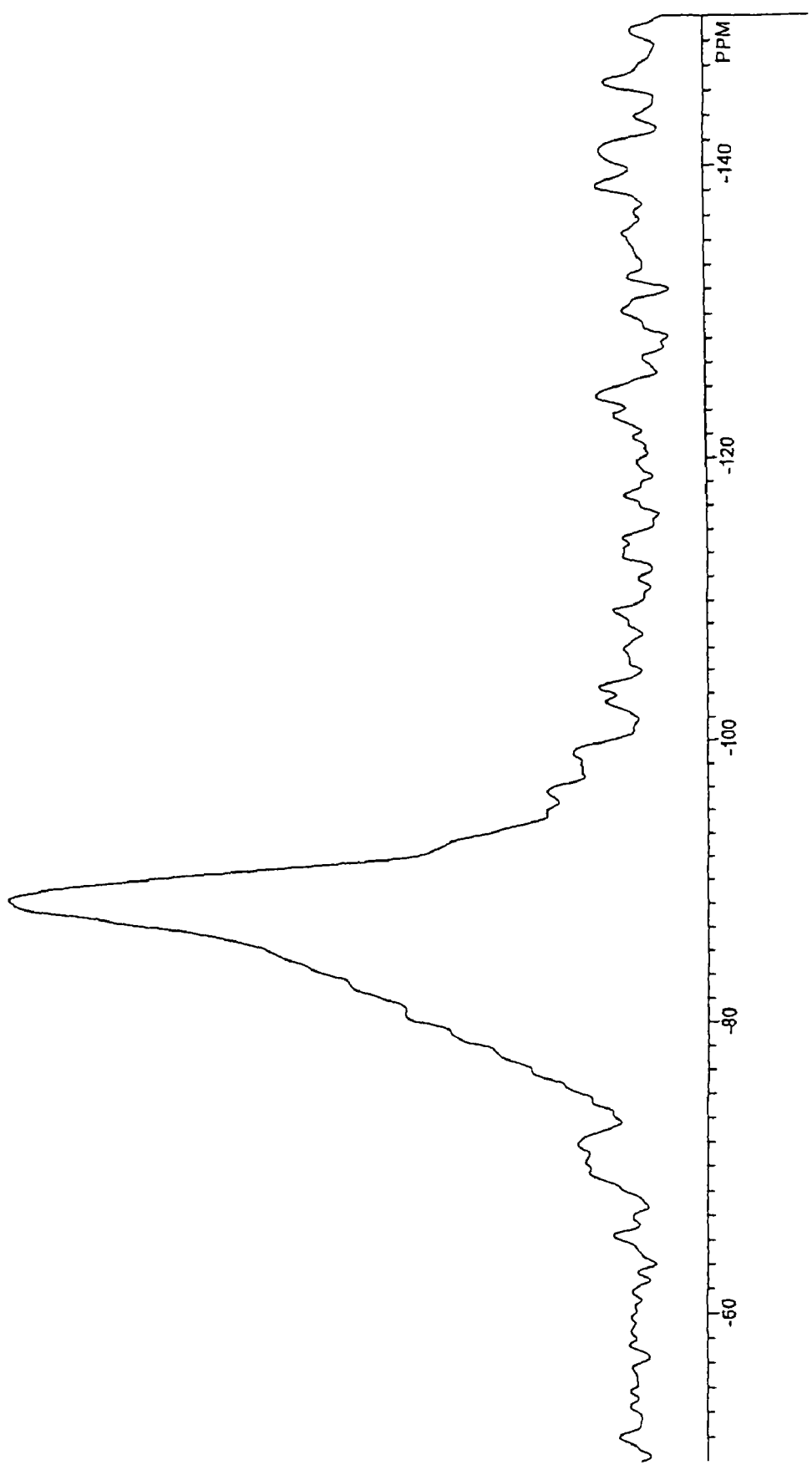
FIG. 3 is a $^{29}$Si-MAS-NMR spectral chart for SAPO-34 (manufactured by UOP LLC) in Example 1.

A $^{29}$Si-MAS-NMR chart for SAPO-34 (manufactured by UOP LLC) is shown in FIG. 3. The spectral chart shows that the integrated intensity area for the signals at from −108 ppm to −123 ppm and the integrated intensity area for the signals at from −70 ppm to −92 ppm were 0.6% and 85.9%, respectively, based on the integrated intensity area for the signals at from −70 ppm to −123 ppm. Furthermore, the heat of adsorption was found to be 58.6 kJ/mol.

Example 2

A CHA-form silicoaluminophosphate was produced in the following manner according to the method described in Japanese Patent Publication No. 37007/1992.

To 18 g of water were gradually added 15.4 g of 85% phosphoric acid and 9.2 g of pseudoboehmite (containing 25% water; manufactured by Condea). The resultant mixture was stirred. Ten grams of water was further added thereto and this mixture was stirred for 1 hour. This liquid is referred to as liquid A. Separately from liquid A, a liquid was prepared by mixing 4.1 g of fumed silica (Aerosil 200), 11.6 g of morpholine, and 15 g of water. This liquid was gradually added to liquid A. Thereto was further added 24 g of water. This mixture was stirred for 3 hours.

The mixture obtained was introduced into a 200-cc stainless-steel autoclave containing a Teflon inner cylinder, and reacted by being allowed to stand at 200° C. for 24 hours. After the reaction, the reaction mixture was cooled and the supernatant was removed by decantation to recover the precipitate. The precipitate obtained was washed with water three times, subsequently taken out by filtration, and dried at 120° C. This precipitate was burned at 550° C. for 6 hours in an air stream to obtain a zeolite.

Analysis by powder XRD revealed that this zeolite was a CHA-form (framework density=14.6 T/1,000 Å$^3$) silicoaluminophosphate. The framework density was determined from the structure by reference to *Atlas Of Zeolite Structure Types* (1996, ELSEVIER), IZA. A sample was dissolved in an aqueous hydrochloric acid solution with heating and this solution was subjected to ICP analysis. As a result, the proportions (molar proportions) of the aluminum, phosphorus, and silicon in the framework structure to the sum of these components were found to be as follows: the proportion of silicon was 0.13, that of aluminum was 0.49, and that of phosphorus was 0.38.

Figure 4:
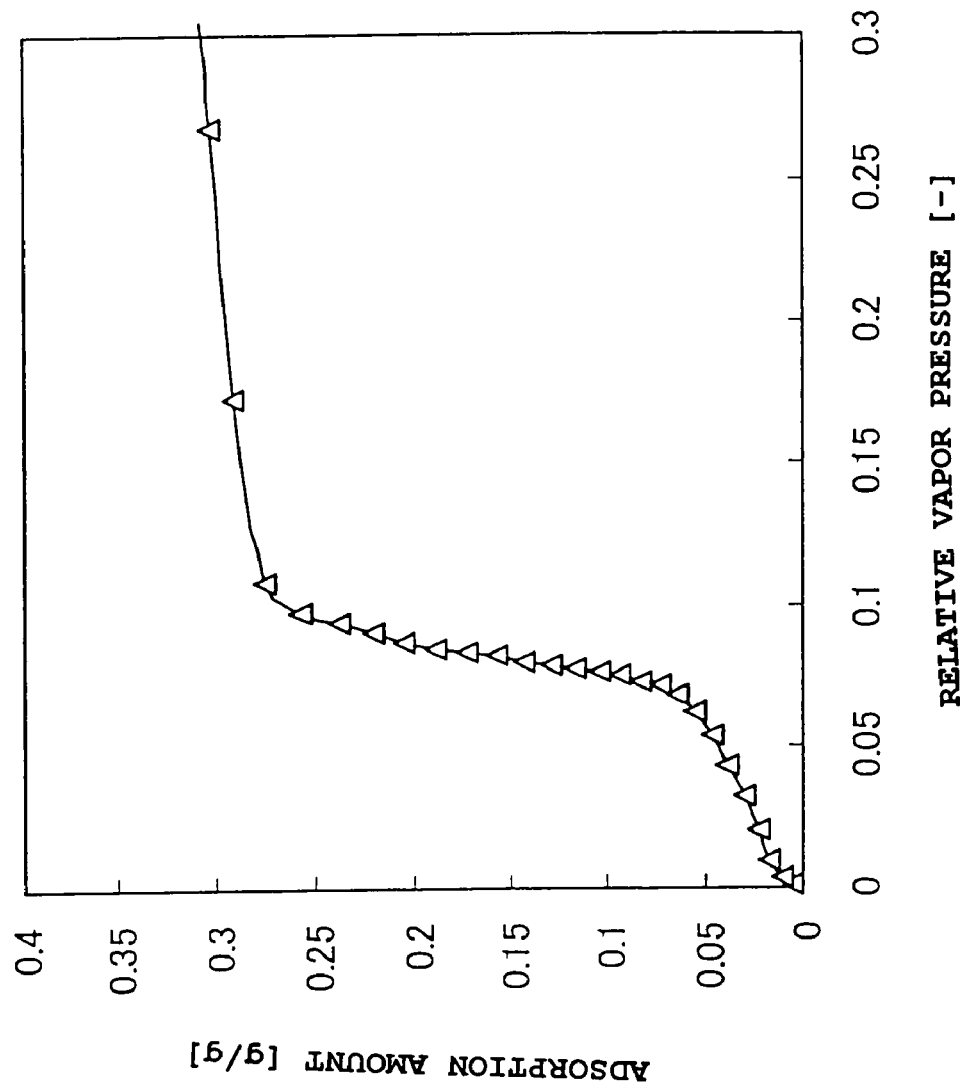
FIG. 4 is a water vapor adsorption isotherm (25° C.) for the zeolite of Example 2.

An adsorption isotherm at 25° C. for this zeolite is shown in FIG. 4. It can be seen from FIG. 4 that this zeolite abruptly adsorbs water vapor at relative vapor pressures of from 0.07 to 0.10, and that the change in adsorption amount in the relative vapor pressure range of from 0.05 to 0.20 is 0.25 g/g.

Figure 5:
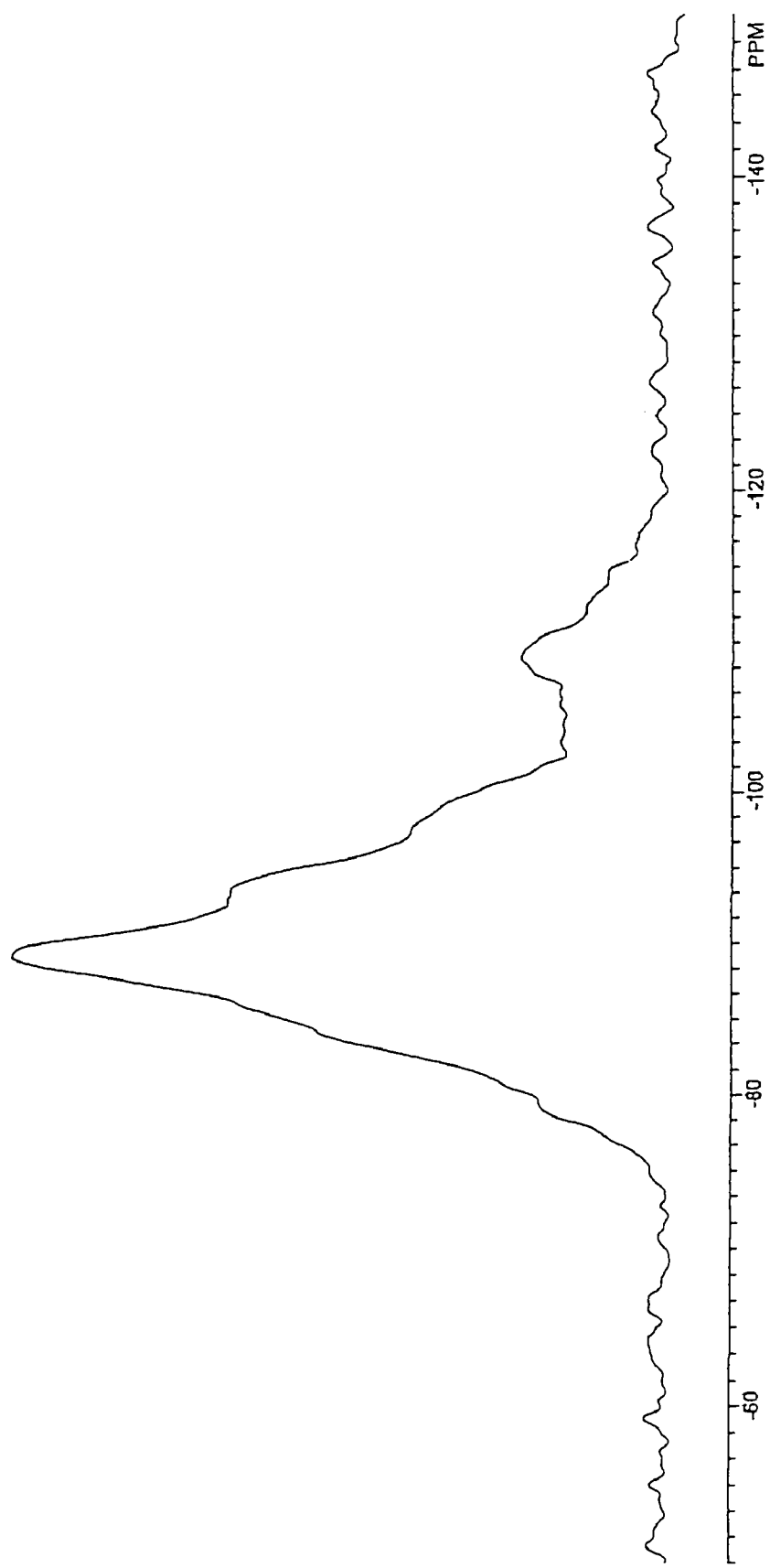
FIG. 5 is an Si-MAS-NMR spectral chart for the $^{29}$zeolite of Example 2.

A $^{29}$Si-MAS-NMR spectral chart for this zeolite is shown in FIG. 5. In this $^{29}$Si-NMR spectrum, the integrated intensity area for the signals at from −108 ppm to −123 ppm and the integrated intensity area for the signals at from −70 ppm to −92 ppm were 9.2% and 52.6%, respectively, based on the integrated intensity area for the signals at from −70 ppm to −123 ppm.

Example 3

To 128 g of water was added 72 g of aluminum isopropoxide. After the mixture was stirred, 38.76 g of 85% phosphoric acid was added thereto and this mixture was stirred for 1 hour. To this solution was added 1.2 g of fumed silica (Aerosil 200), followed by 89.3 g of 35% aqueous tetraethylammonium hydroxide (TEAOH). The resultant mixture was stirred for 3 hours. This mixture was introduced into a 500-cc stainless-steel autoclave containing a Teflon inner cylinder, and reacted at 185° C. for 60 hours with stirring at 100 rpm. After the reaction, the reaction mixture was cooled and the reaction product was separated by centrifuging, washed with water, and dried at 120° C. This reaction product was burned at 550° C. for 6 hours in an air stream to obtain a zeolite.

Analysis by powder XRD revealed that this zeolite was a CHA-form silicoaluminophosphate (framework density=14.6 T/1,000 Å$^3$). A sample was dissolved in an aqueous hydrochloric acid solution with heating and this solution was subjected to ICP analysis. As a result, the proportions (molar proportions) of the aluminum, phosphorus, and silicon in the framework structure to the sum of these components were found to be as follows: the proportion of silicon was 0.03, that of aluminum was 0.50, and that of phosphorus was 0.47.

Figure 6:
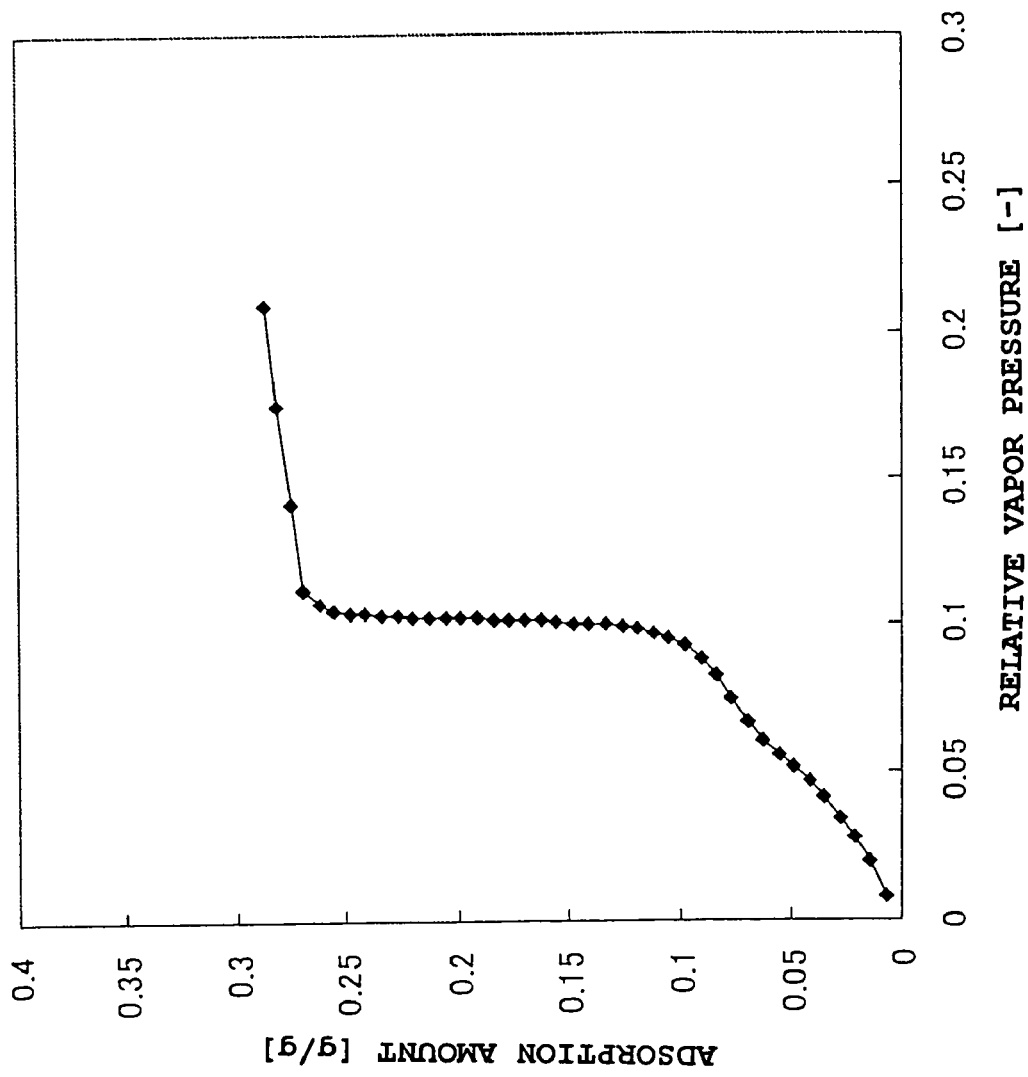
FIG. 6 is a water vapor adsorption isotherm (25° C.) for the zeolite of Example 3.

An adsorption isotherm at 25° C. for this zeolite is shown in FIG. 6. It can be seen from FIG. 6 that this zeolite shows an adsorption isotherm similar to that of the zeolite of Example 2. Namely, this zeolite abruptly adsorbs water vapor at relative vapor pressures of from 0.07 to 0.10, and the change in adsorption amount in the relative vapor pressure range of from 0.05 to 0.20 is 0.23 μg.

The heat of adsorption was 58.2 kJ/mol.

Example 4

Figure 7:
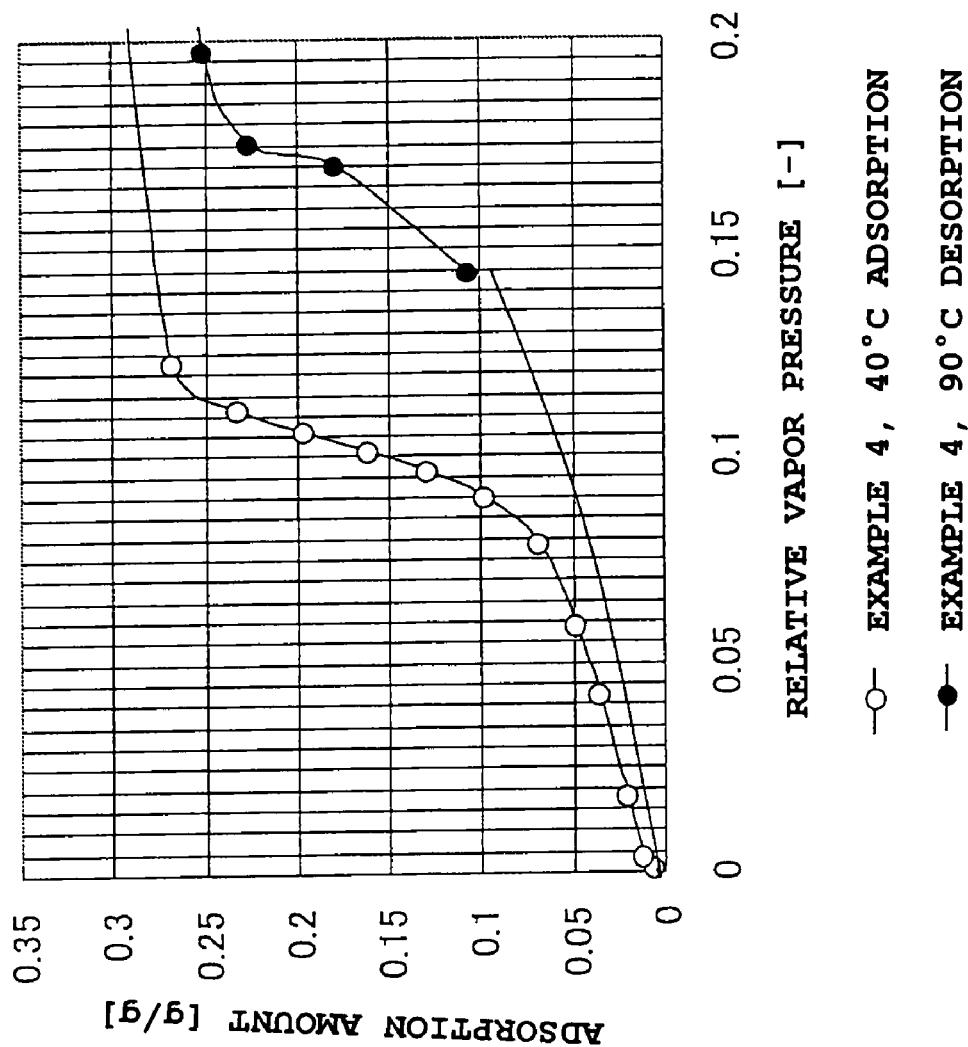
FIG. 7 is water vapor adsorption isotherms for SAPO-34 (manufactured by UOP LLC) in Example 4 which were obtained in adsorption process at 40° C. and desorption process at 90° C.

SAPO-34 (manufactured by UOP LLC) was examined with an adsorption isotherm analyzer (Belsorb 18, manufactured by Bel Japan Inc.). In FIG. 7 is shown an adsorption-process water vapor adsorption isotherm at 40° C. for SAPO-34. The examination for adsorption isotherm was conducted under the conditions of a high-temperature air chamber temperature of 50° C., adsorption temperature of 40° C., initial pressure introduced of 3.0 Torr, number of points for setting pressure introduced of 0, saturated vapor pressure of 55.33 mmHg, and equilibrium time of 500 seconds.

On the other hand, a desorption-process adsorption isotherm was obtained with a gravimetric-method adsorption amount analyzer including a magnetic levitation balance (manufactured by Bel Japan Inc.) and, connected thereto, a vapor introduction part comprising a gas generation part, pressure measurement part, and gas discharge part which were disposed in a thermostatic air chamber. In obtaining a desorption-process adsorption isotherm, water vapor was discharged 50 Torr by 50 Torr at a high-temperature air chamber temperature of 120° C. and a desorption temperature of 90° C. to determine the weight changes. The results are shown in FIG. 7.

On the assumption that the adsorbent is applied to an automotive air conditioning system for general motor vehicles, the conditions may include T1=90° C., T2=40° C., and T0=10° C. It can be seen that under such conditions, the desorption-side relative vapor pressure $\phi1$ and the adsorption-side relative vapor pressure $\phi2$ are 0.11 and 0.17, respectively, and the difference in adsorption amount between $\phi1$ and $\phi2$ is 0.21 g/g. This value is higher than the target adsorption amount difference of 0.15 g/g. It can hence be seen that the automotive air conditioning system sufficiently functions in general motor vehicles.

When T1=90° C., T2=40° C., and T0=5° C., then the difference in adsorption amount between $\phi1$=0.11 and $\phi2$=0.12 is 0.20 g/g. This value is higher than the target adsorption amount difference of 0.15 g/g. It can hence be seen that the air conditioning system sufficiently functions.

Figure 8:
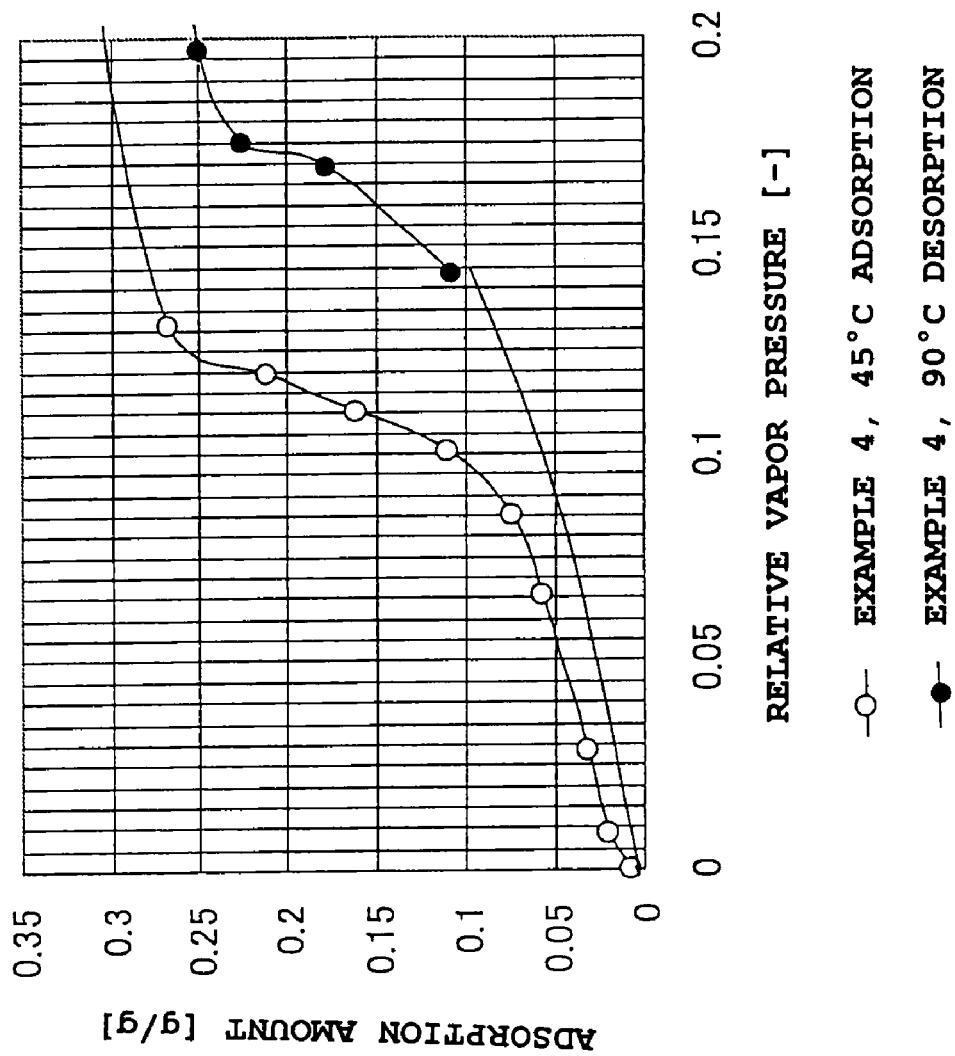
FIG. 8 is water vapor adsorption isotherms for SAPO-34 (manufactured by UOP LLC) in Example 4 which were obtained in adsorption process at 45° C. and desorption process at 90° C.

Furthermore, it is presumed that in some regions, the cooling water temperature T2 increases to around 45° C. due to severe ambient conditions. Conditions for obtaining T0=10° C. when T1=90° C. in this case are investigated. Belsorb 18 was used to obtain an adsorption-process adsorption isotherm at 45° C. This isotherm is shown in FIG. 8 together with a desorption-process adsorption isotherm at 90° C. The examination for obtaining the adsorption isotherm at 45° C. was conducted under the conditions of a high-temperature air chamber temperature of 65° C., adsorption temperature of 45° C., initial pressure introduced of 3.0 Torr, number of points for setting pressure introduced of 0, saturated vapor pressure of 55.33 mmHg, and equilibrium time of 500 seconds. In the case where T1=90° C., T2=45° C., and T0=10° C., then the desorption-side relative humidity $\phi1$ is 0.14, which is higher than the adsorption-side relative humidity $\phi2$ of 0.13.

It can be seen that even in such a case in which the desorption-side relative vapor pressure is higher than the adsorption-side relative vapor pressure, an adsorption amount difference of 0.16 g/g is obtained with the adsorbent of Example 4, which has a temperature dependence. The adsorption heat pump employing the water vapor adsorbent of Example 4 has proved to sufficiently work even in high-temperature regions.

REFERENCE EXAMPLE

To 173.4 g of water was added 115.3 g of 85% phosphoric acid. Thereto was gradually added 68 g of pseudoboehmite (containing 25% water; manufactured by Condea). This mixture was stirred for 3 hours. Thereto was added 30 g of fumed silica, followed by 87.2 g of morpholine and 242.3 g of water. The resultant mixture was stirred for 4.5 hours. This mixture was allowed to stand for aging at room temperature overnight. The mixture was then introduced into an induction stirring type 1-liter stainless-steel autoclave containing a Teflon inner cylinder, and reacted at 200° C. for 24 hours with stirring at 60 rpm. After the reaction, the reaction mixture was cooled and the supernatant was removed by decantation to recover the precipitate. The precipitate thus obtained was washed with water, taken out by filtration, and dried at 120° C. This precipitate was burned at 550° C. in an air stream to obtain a zeolite. Analysis by XRD revealed that this zeolite was in a CHA form. A sample was dissolved in an aqueous hydrochloric acid solution with heating and this solution was subjected to ICP analysis. As a result, the proportions (molar proportions) of the aluminum, phosphorus, and silicon in the framework structure to the sum of these components were found to be as follows: the proportion of silicon was 0.12, that of aluminum was 0.49, and that of phosphorus was 0.39.

Figure 9:
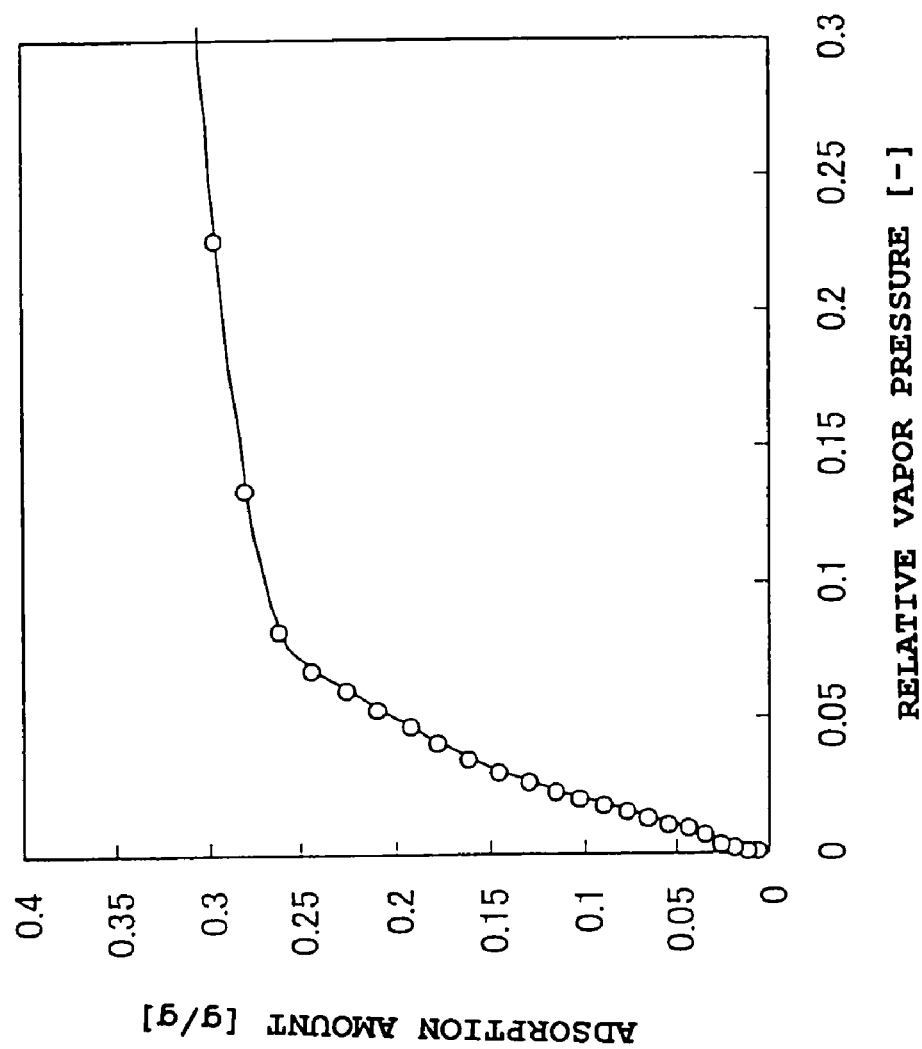
FIG. 9 is a water vapor adsorption isotherm (25° C.) for the zeolite of Reference Example.

An adsorption isotherm at 25° C. for this zeolite is shown in FIG. 9. It can be seen from FIG. 9 that this zeolite begins to abruptly adsorb water vapor immediately after initiation of adsorption operation even when the relative vapor pressure is still very low, and that the change in adsorption amount in the relative vapor pressure range of from 0.05 to 0.20 is as small as 0.1 g/g or less. These results show that this zeolite is unsuitable for use as an adsorbent for adsorption heat pumps.

Figure 10:
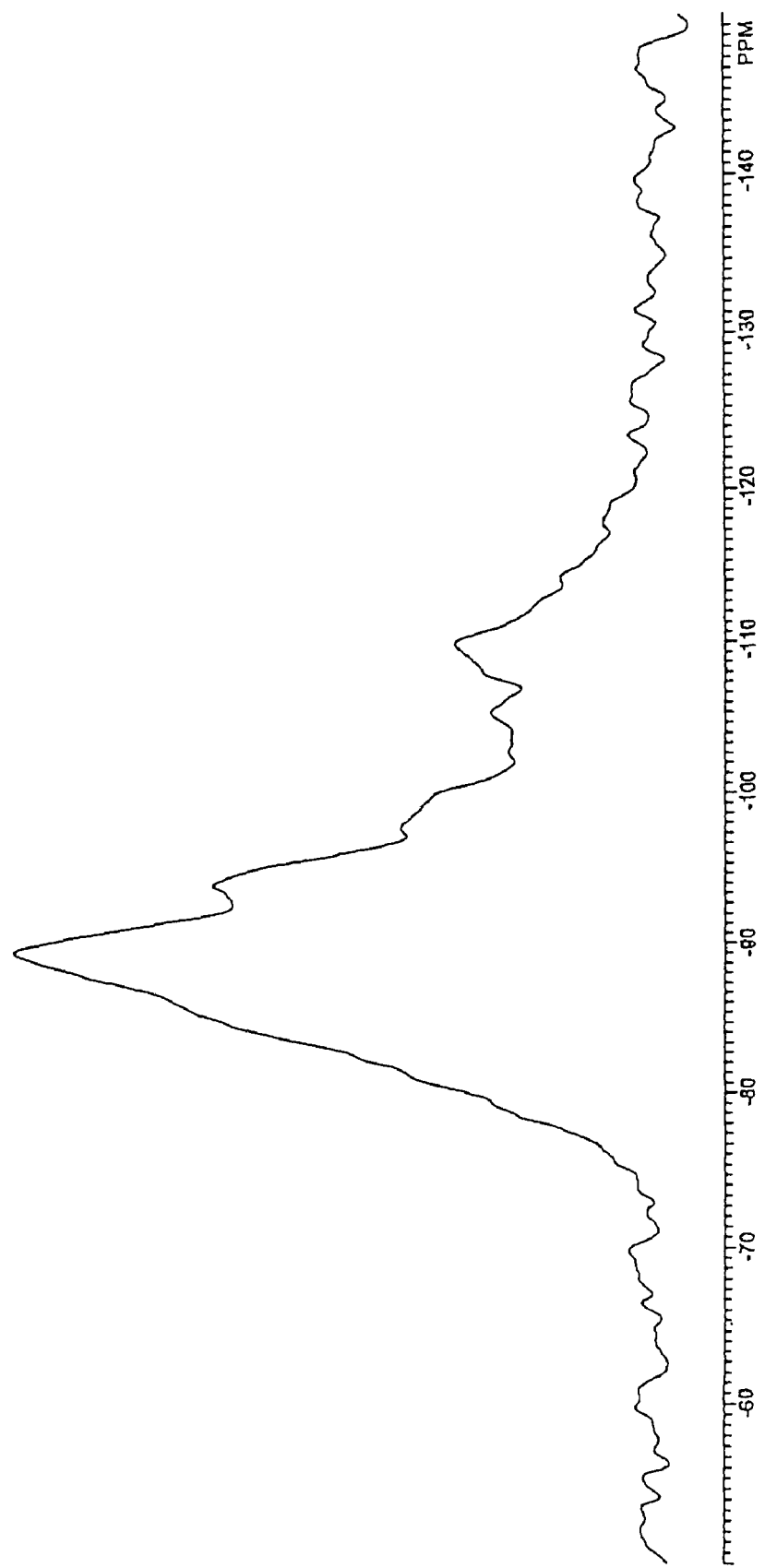
FIG. 10 is a $^{29}$Si-MAS-NMR spectral chart for the zeolite of Reference Example.

This zeolite was subjected to Si-MAS-NMR analysis under the same conditions, and the results thereof are shown in FIG. 10. In the $^{29}$Si-MAS-NMR spectrum, the integrated intensity area for the signals at from −108 ppm to −123 ppm and the integrated value for the signals at from −70 ppm to −92 ppm were 13.0% and 51.6%, respectively, based on the integrated intensity area for the signals at from −70 ppm to −123 ppm. It can be seen from these results that even a CHA-form silicoaluminophosphate is unsuitable for use as an adsorbent to be regenerated with a heat source of 100° C. or lower, when the peak appearing at around −110 ppm has a high intensity. The heat of adsorption was 61.3 kJ/mol.

COMPARATIVE EXAMPLE 1

A mesoporous molecular sieve (FSM-10) shows an adsorption amount difference as large as 0.25 g/g in the relative vapor pressure range of from 0.20 to 0.35 (according to Japanese Patent Laid-Open No. 178292/1997, FIG. 14, graph 4 for FSM-10). However, it shows a small adsorption amount when the relative vapor pressure is in range of from 0.05 to 0.30, which is an example of conditions for the operation of the adsorption heat pumps of the invention. In this range, the relative vapor pressure region where the adsorbent shows a large adsorption amount change is from 0.15 to 0.30. However, the adsorption amount difference in this region is 0.08 g/g, showing that this adsorbent has poor performance in adsorption heat pumps.

COMPARATIVE EXAMPLE 2

Figure 11:
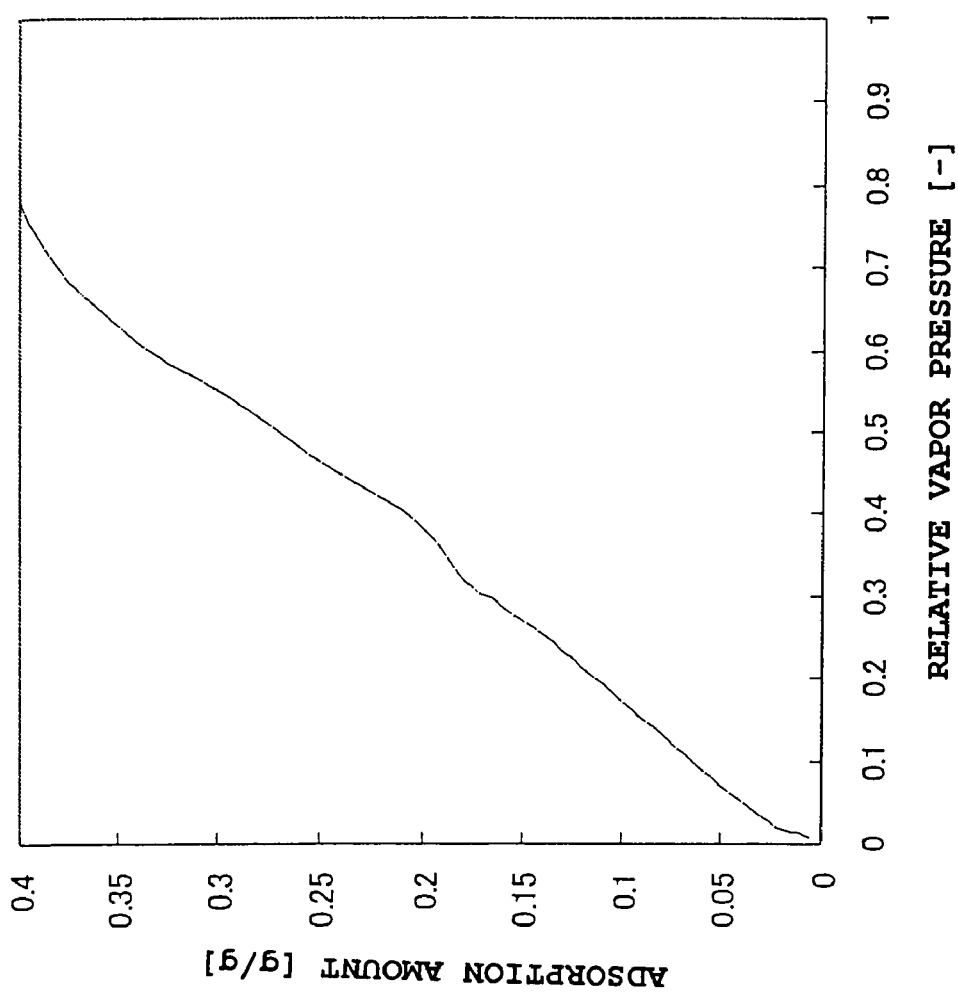
FIG. 11 is a water vapor adsorption isotherm (25° C.) for A-form silica gel in Comparative Example 2.

A-form silica gel (manufactured by Fuji Silysia Chemical Ltd.), which is known as an adsorbent suitable for adsorption heat pumps, was examined with an adsorption isotherm analyzer (Belsorb 18, manufactured by Bel Japan Inc.) to obtain a water vapor adsorption isotherm at an adsorption temperature of 25° C. This isotherm is shown in FIG. 11. This measurement was made under the same conditions as for the SAPO-34 in Example 1. The adsorption isotherm for A-form silica gel given in FIG. 11 shows that over the relative vapor pressure range of from 0 to 0.7, A-form silica gel gives an adsorption amount nearly proportional to the relative vapor pressure. However, in the relative vapor pressure range of from 0.15 to 0.30, A-form silica gel shows an adsorption amount change as small as 0.08 g/g like the mesoporous molecular sieve and porous aluminum phosphate molecular sieves. Although adsorption heat pumps employing a silica gel as an adsorbent have been marketed, the apparatus size should be large because of this small adsorption amount difference.

COMPARATIVE EXAMPLE 3

Figure 12:
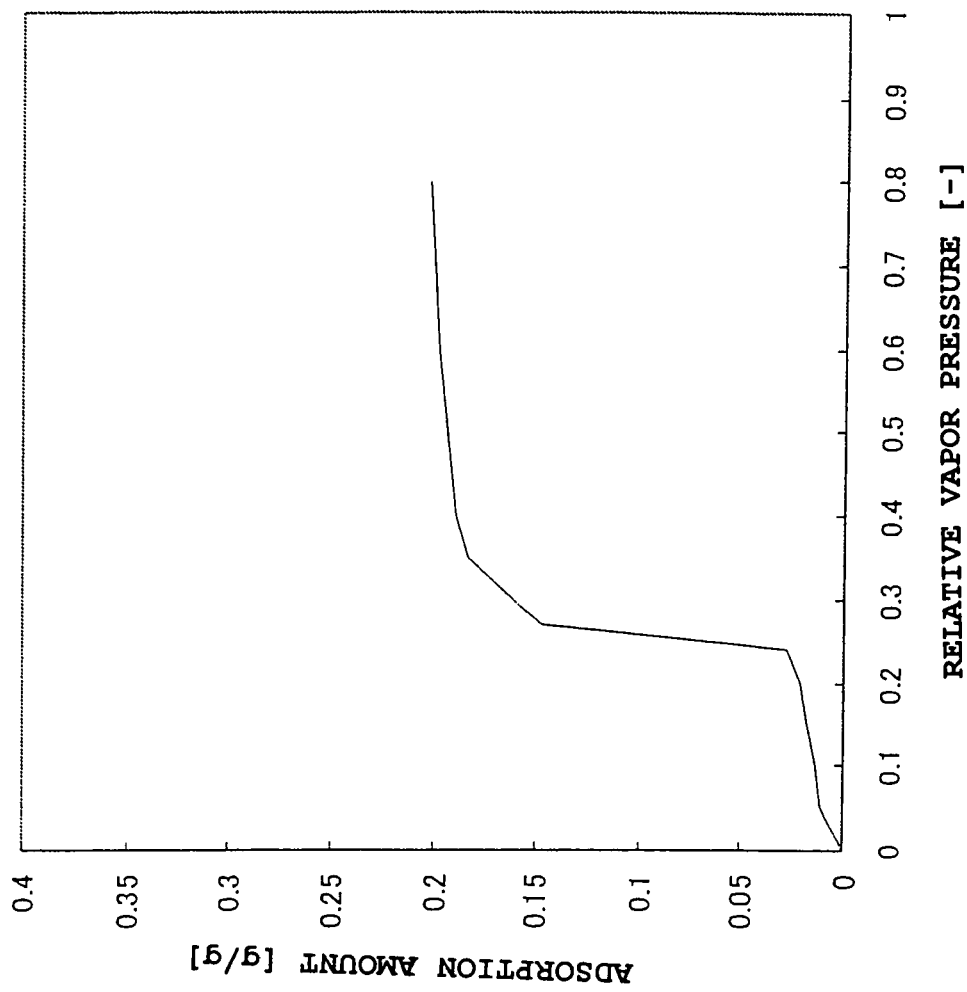
FIG. 12 is a water vapor adsorption isotherm (30° C.) for ALPO-5 in Comparative Example 3.

In FIG. 12 is shown an adsorption isotherm for ALPO-5, which is AFI-form (framework density=17.5 T/1,000 Å$^3$) zeolite as a porous aluminum phosphate molecular sieve (the isotherm is a quotation from *Colloid Polym Sci*, 277, pp. 83-88 (1999), FIG. 1 (adsorption temperature 30° C.)). The isotherm shows the following. ALPO-5 shows an abrupt increase in adsorption amount in the relative vapor pressure range of from 0.25 to 0.40 and can be caused to adsorb and release the adsorbate in the relative vapor pressure range of from 0.05 to 0.3. However, the adsorption amount change in the relative vapor pressure range of from 0.15 to 0.30 was as small as 0.14 g/g.

While the invention has been described in detail and with reference to specific embodiments thereof, it will be apparent to one skilled in the art that various changes and modifications can be made therein without departing from the spirit and scope thereof.

This application is based on a Japanese patent application filed on Feb. 21, 2001 (Application No. 2001-045677), Japanese patent application filed on Apr. 10, 2001 (Application No. 2001-111902), Japanese patent application filed on Jun. 25, 2001 (Application No. 2001-191893), and Japanese patent application filed on Sep. 26, 2001 (Application No. 2001-293990), the contents thereof being herein incorporated by reference.

INDUSTRIAL APPLICABILITY

One feature of the invention resides in that adsorbents having the properties described above are used. These adsorbents can be used in the adsorption part of an adsorption heat pump. They give a large change in adsorption amount with a change in relative vapor pressure in a narrow range. Consequently, these adsorbents are suitable for use in an adsorption heat pump in which the adsorbent packing amount is limited, for example, an air conditioning system for motor vehicles.

In the adsorption heat pumps of the invention, the adsorbents have a large difference in water adsorption amount in adsorption/desorption and can be regenerated (release the adsorbate) at a low temperature. Consequently, the adsorption heat pumps can be efficiently operated with a heat source having a lower temperature than ones heretofore in use. Furthermore, the adsorbents to be used in the invention show a larger change in adsorption amount than the silica gels and zeolites heretofore in use in the same relative vapor pressure range. Consequently, the adsorption heat pumps can produce a higher dehumidifying effect when the adsorbents are used in almost the same weight.

Namely, with the adsorbents according to the invention, adsorption heat pumps capable of operating with a heat source having a relatively low temperature of 100° C. or below can be provided.

The invention claimed is:

1. In a method for adsorbing and desorbing an adsorbate on an adsorbent at a temperature at which water is desorbed from the adsorbent, which comprises heating the adsorbent with waste heat from at least one of an automotive engine, a gas engine, a gas turbine, and a fuel cell, the improvement wherein:
   the adsorbent comprises a zeolite containing aluminum, silicon and phosphorus in the framework structure, and
   the adsorbent has a region in which an adsorption amount difference as determined with the following equation is 0.15 g/g or larger in the range in which the relative vapor pressure $\phi 2b$ when water is adsorbed thereon is from 0.115 to 0.18 and the relative vapor pressure $\phi 1b$ when water is desorbed therefrom is from 0.1 to 0.14;
   wherein the adsorption amount difference is Q2−Q1, wherein Q1 is the adsorption amount of water at $\phi 1b$ as determined from a desorption isotherm of water obtained at a temperature (T3) at which water is desorbed from the adsorbent, and wherein Q2 is adsorption amount of water at $\phi 2b$ as determined from an adsorption isotherm of water obtained at a temperature (T4) at which the water is adsorbed onto the adsorbent.

2. The method of claim 1, wherein the zeolite has a $^{29}$Si-NMR spectrum in which the integrated intensity area for the signals at from −108 ppm to −123 ppm is not more than 10% based on the integrated intensity area for the signals at from −70 ppm to −123 ppm.

3. The method as claimed in claim 2, wherein the zeolite gives a $^{29}$Si-MAS-NMR spectrum in which the integrated intensity area for the signals at from −70 ppm to −92 ppm is not less than 25% based on the integrated intensity area for the signals at from −70 ppm to −123 ppm.

4. The method of claim 1, wherein the silicon is present in the framework structure of the zeolite in a molar ratio amount of from 0.03 to 0.13 based on the total molar amount of silicon, phosphorus and aluminum in the framework structure.

5. The method as claimed in claim 1, wherein the zeolite has a framework density in a range of from 10.0 T/1,000 Å$^3$ to 16.0 T/1,000 Å$^3$.

6. The method of claim 1, wherein the zeolite has a pore diameter of from 3 Å to 10 Å, and has differential heat of adsorption of from 40 kJ/mol to 65 kJ/mol.

7. The method as claimed in claim 1, wherein the zeolite has the structure represented by CHA in terms of the code defined by International Zeolite Association (IZA).

8. The method as claimed in claim 1, wherein the zeolite content is 60% by weight or higher based on the whole adsorbent.

9. In a method for adsorbing and desorbing an adsorbate on an adsorbent which comprises heating the adsorbent with waste heat from at least one of an automotive engine, a gas engine, a gas turbine, and a fuel cell, the improvement wherein:
   the adsorbent comprises a zeolite containing aluminum, silicon and phosphorus in the framework structure, and
   the adsorbent has a region in which an adsorption amount difference as determined with the following equation is 0.15 g/g or larger in the range in which the relative vapor pressure $\phi 2b$ when water is adsorbed thereon is from 0.115 to 0.18 and the relative vapor pressure $\phi 1b$ when water is desorbed therefrom is from 0.1 to 0.14;
   wherein the adsorption amount difference is Q2−Q1, wherein Q1 is the adsorption amount of water at $\phi 1b$ as determined from a desorption isotherm of water obtained at a temperature (T3) at which water is desorbed from the adsorbent, and wherein Q2 is adsorption amount of water at ϕ2b as determined from an adsorption isotherm of water obtained at a temperature (T4) at which the water is adsorbed onto the adsorbent.

10. The method of claim 9, wherein the zeolite has a $^{29}$Si-NMR spectrum in which the integrated intensity area for the signals at from −108 ppm to −123 ppm is not more than 10% based on the integrated intensity area for the signals at from −70 ppm to −123 ppm.

11. The method as claimed in claim 10, wherein the zeolite gives a $^{29}$Si-MAS-NMR spectrum in which the integrated intensity area for the signals at from −70 ppm to −92 ppm is not less than 25% based on the integrated intensity area for the signals at from −70 ppm to −123 ppm.

12. The method of claim 9, wherein the silicon is present in the framework structure of the zeolite in a molar ratio amount of from 0.03 to 0.13 based on the total molar amount of silicon, phosphorus and aluminum in the framework structure.

13. The method of claim 9, wherein the zeolite has a framework density in a range of from 10.0 T/1,000 Å$^3$ to 16.0 T/1,000 Å$^3$.

14. The method of claim 9, wherein the zeolite has a pore diameter of from 3 Å to 10 Å, and has differential heat of adsorption of from 40 kJ/mol to 65 kJ/mol.

15. The method as claimed in claim 9, wherein the zeolite has the structure represented by CHA in terms of the code defined by International Zeolite Association (IZA).

16. The method as claimed in claim 9, wherein the zeolite content is 60% by weight or higher based on the whole adsorbent.

* * * * *